(12) United States Patent
Mochimaru et al.

(10) Patent No.: US 7,565,957 B2
(45) Date of Patent: Jul. 28, 2009

(54) DAMPER AND VIBRATION DAMPING STRUCTURE USING THE SAME

(75) Inventors: Masami Mochimaru, Minato-ku (JP); Sumio Kawaguchi, Minato-ku (JP); Mitsuru Miyazaki, Minato-ku (JP); Akio Suzuki, Minato-ku (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 11/653,355

(22) Filed: Jan. 16, 2007

(65) Prior Publication Data

US 2007/0108002 A1    May 17, 2007

Related U.S. Application Data

(62) Division of application No. 10/504,294, filed as application No. PCT/JP03/01328 on Feb. 7, 2003, now Pat. No. 7,182,187.

(30) Foreign Application Priority Data

Feb. 21, 2002 (JP) ............................. 2002-045367
Dec. 10, 2002 (JP) ............................. 2002-358091

(51) Int. Cl.
*F16F 9/24* (2006.01)
(52) U.S. Cl. .................. 188/297; 267/64.15; 267/201; 267/219
(58) Field of Classification Search ............. 267/64.13, 267/64.15, 118, 119, 201, 217, 219, 226; 188/293, 297, 305
See application file for complete search history.

(56) References Cited

U.S. PATENT DOCUMENTS 5,224,689 A * 7/1993 Georgiev .................. 267/225
6,037,403 A   3/2000 Katase et al.
2002/0190445 A1  12/2002 Achenbach
2003/0089565 A1 * 5/2003 Salice ...................... 188/283
2005/0077664 A1   4/2005 Mochimaru et al.

FOREIGN PATENT DOCUMENTS

| DE | 20117031    | * 12/2001 |
| JP | 63-9740     | 1/1988    |
| JP | 01 187271 A | 7/1989    |
| JP | 03-265729   | 11/1991   |

(Continued)

OTHER PUBLICATIONS

Microfilm of the specification and drawings annexed to the request of Japanese Utility Model Application No. 196226/1987 (Laid-Open No. 98938/1989) (The Yokohama Rubber Co., Ltd.) Jul. 3, 1989.

*Primary Examiner*—Robert A Siconolfi
*Assistant Examiner*—Mariano Sy
(74) *Attorney, Agent, or Firm*—Nixon & Vanderhye P.C.

(57) ABSTRACT

A damper includes a hollow outer elongated body; a hollow inner elongated body; a liquid viscous body or liquid viscoelastic body disposed in a gap between an inner surface of the elongated body and an outer surface of the elongated body in such a manner as to be in contact with the inner surface and the outer surface of these elongated bodies, respectively; and first and second attaching structures. Further, a controller may be provided to control an increase or decrease in the internal pressure of the liquid viscous body or the liquid viscoelastic body.

4 Claims, 12 Drawing Sheets

FOREIGN PATENT DOCUMENTS

| | | |
|---|---|---|
| JP | 04-38936 | 6/1992 |
| JP | 09-279695 | 10/1997 |
| JP | 10 046865 A | 2/1998 |
| JP | 10-231555 | 9/1998 |
| JP | 11-247488 A | 9/1999 |
| JP | 11-280294 A | 10/1999 |
| JP | 2000-017885 | 1/2000 |
| JP | 2000-129933 A | 5/2000 |
| JP | 2000-274474 | 10/2000 |
| JP | 2001-336560 | 12/2001 |

* cited by examiner

DAMPER AND VIBRATION DAMPING STRUCTURE USING THE SAME

CROSS-REFERENCE TO RELATED APPLICATIONS

This is a divisional of U.S. application Ser. No. 10/504,294, filed Aug. 12, 2004 now U.S. Pat. No. 7,182,187, allowed, which is a U.S. national phase of International Application No. PCT/JP03/01328, filed Feb. 7, 2003 which designated the U.S. and claims the benefit of Japanese Patent Application No. 2002-045367, filed Feb. 21, 2002 and Japanese Patent Application No. 2002-358091, filed Dec. 10, 2002, each incorporated herein by reference in its entirety.

TECHNICAL FIELD

The present invention relates to a damper for damping the vibration of a building or the like caused by an earthquake by being installed in a wall of the building or the like in the form of a diagonal brace or by being installed on a column of a building or the like in a vertical direction in parallel to the column, as well as to a vibration damping structure in which this damper is interiorly fitted by being installed in a wall of a building in the form of a diagonal brace or by being installed on a column in such a manner as to extend substantially in parallel to the column in a substantially vertical direction.

BACKGROUND ART

Techniques have already been proposed in which dampers are embedded in walls of a building or the like to provide the walls with a vibration damping structure to thereby provide the overall building with a vibration damping structure.

A cylinder-rod type damper having a cylinder and a rod passed through the cylinder as a damper of this type is used such that one end portion side of the cylinder is fixed to a column or a horizontal member in one corner portion of a wall space defined by left and right columns and upper and lower horizontal members, and one end portion side of the rod projecting from the cylinder is fixed to the column or horizontal member in another corner portion on a diagonal line with respect to the one corner portion in the wall space.

Incidentally, since it is necessary for such a damper to extend or contract and swing with respect to the columns or the horizontal members at the respective corner portions when the building shakes due to an earthquake and the wall space undergoes deformation, the one end portion side of the cylinder and the one end portion side of the rod are respectively fixed swingably to the columns or the horizontal members at the respective corner portions by means of swivel fittings or the like. However, the use of such swivel fittings or the like entails a rise in the cost. Moreover, there is a possibility of abnormal noise being generated due to the sliding in swinging, and there is a possibility of impairing the damping effect due to looseness in installation.

In addition, with the cylinder-rod type damper, if the cylinder and the rod are made long in an attempt to generate a large damping force so as to efficiently damp vibrations due to an earthquake at an early period, the occupying space in the axial direction becomes large in the installation. Moreover, a thick cylinder and a large rod are inevitably used so as not to cause deflection or the like, so that the weight becomes extremely large. On the other hand, if the gap between the cylinder and the rod is made small, the cylinder and the rod come into contact with each other in connection with the dimensional accuracy in the manufacture of the cylinder and the rod. In some cases, the rod becomes unable to move in the axial direction with respect to the cylinder.

The present invention has been devised in view of the above-described aspects, and its object is to provide a damper which with a simple construction can be installed in a wall in the form of a diagonal brace or installed on a column in such a manner as to extend substantially in parallel to the column in a substantially vertical direction, and which is capable of reducing the cost, and does not produce abnormal noise in shaking, as well as a vibration damping structure using the same.

Another object of the present invention is to provide a damper which is capable of generating a large damping force without enlarging the occupying space in the axial direction and the weight and without causing an undesirable situation such as contact between the cylinder and the rod, as well as a vibration damping structure using the same.

DISCLOSURE OF THE INVENTION

The damper according to a first aspect of the invention comprises: at least a hollow outer elongated body and an inner elongated body, the inner elongated body including an inserted portion which has an outer surface extending in an axial direction and disposed with a gap with respect to an axially extending inner surface of the outer elongated body, and which is inserted in the outer elongated body so as to be relatively movable in the axial direction, and one end portion which integrally extends from the inserted portion in the axial direction and projects to the outside from one axial end portion of the outer elongated body, a viscous body or a viscoelastic body being disposed in the gap between the inner surface of the outer elongated body and the outer surface of the inner elongated body in such a manner as to be in contact with the inner surface and the outer surface, a one-side attaching plate member being secured to another end portion of the outer elongated body, an other-side attaching plate member being secured to the one end portion of the inner elongated body.

In accordance with the damper according to the first aspect, by connecting this damper to such as columns and horizontal members by means of the respective attaching plate members, the inner elongated body is relatively moved in the axial direction with respect to the outer elongated body in the relative vibration of, for instance, the lower horizontal member with respect to the upper horizontal member in a horizontal direction within the plane of the wall space owing to an earthquake or the like. In consequence, the viscous body or the viscoelastic body disposed in the gap between the inner surface of the outer elongated body and the outer surface of the inner elongated body is caused to undergo viscous shear deformation and is capable of absorbing the relative vibrational energy. Further, the damper can be simply and firmly connected to the columns, the horizontal members, or the like by means of the respective attaching plate members instead of the swivel fittings, through, for example, frictional joining using the splice plates and the like for clamping the attaching plate members at wide attaching surfaces of the attaching plate members. Therefore, it is possible to install the damper in the wall with a simple construction in the form of a diagonal brace or in parallel to the column, and it is possible to lower the cost. Moreover, abnormal noise does not occur in the shaking, and looseness in installation does not occur. Additionally, it is possible to attain low cost and obtain firm connection.

In the invention, the damper may be comprised of a single outer elongated body and a single inner elongated body. Alternatively, however, the damper may be constructed by providing a plurality of sets of the outer elongated body and the inner elongated body, by integrating the plurality of outer elongated bodies by being secured to each other, by using the one-side attaching plate member in common by being secured to respective other end portions of the plurality of outer elongated bodies, and by using the other-side attaching plate member in common by being secured to the plurality of inner elongated bodies.

In the invention, the one-side attaching plate member may be secured to the other end portion of the outer elongated body by means of a collar member or a cover member. In this case, however, it suffices if the collar member or the cover member is secured to the other end portion of the outer elongated body by welding or the like, and the one-side attaching plate member is secured to the collar member or the cover member by welding, bolts or the like.

In the damper in accordance with the invention, it suffices if the collar member or the cover member is secured to the other end portion of the outer elongated body by welding or the like, and the other-side attaching plate member is secured to the collar member or the cover member by welding, bolts or the like.

In the case where the filled viscous body or viscoelastic body is set in a hermetically sealed state, the damper should preferably comprise: control means for controlling an increase or decrease of the internal pressure of the viscous body or the viscoelastic body in the extension or retraction of the inserted portion of the inner elongated body in the axial direction with respect to an interior of the outer elongated body.

In the damper according to this first aspect, the gap and at least one of the outer and the inner elongated bodies have the relationship of the following formulae (1) and (2):

$$10 \leq d \cdot t \leq 100 \quad (1)$$

$$0.5 \leq t/d \leq 8 \quad (2)$$

where d is the thickness of the gap in a direction perpendicular to the axial direction, and t is the thickness of at least one of the outer and the inner elongated bodies in the direction perpendicular to the axial direction.

In the damper in accordance with the invention, the viscous body or the viscoelastic body disposed in the gap is caused to undergo shear deformation by the relative axial movement of the inner elongated body with respect to the outer elongated body, so as to generate a damping force. Thus the vibrations of the building or the like due to an earthquake are damped. Hence, the magnitude of the damping force is inversely proportional to the thickness d of the gap in a direction perpendicular to the axial direction. Consequently, it is necessary for the elongated bodies to have strength capable of withstanding the damping force of a magnitude proportional to such a thickness d. If the product (d·t) of the thickness d and the thickness t of the elongated body in the direction perpendicular to the axial direction is less than 10, the elongated body becomes strengthwise weak with respect to the damping force generated. In some cases, therefore, the damper is unable to withstand the damping force generated, and has the possibility of becoming bent. On the other hand, if the product (d·t) is greater than 100, the thickness t becomes more than is necessary in comparison with the magnitude of the damping force generated. Hence, the damper becomes large in weight and diameter, which constitutes a factor for increased cost.

In addition, in the damper in accordance with the invention, the viscous body or the viscoelastic body generates heat in the repeated shear deformation of the viscous body or the viscoelastic body in a short period of time. However, unless this heat is caused to escape efficiently and speedily, the viscosity or the viscoelasticity of the viscous body or the viscoelastic body declines, and there is a possibility that an intended damping force fails to be generated. If the ratio (t/d) between the thickness t and the thickness d is smaller than 0.5, in most cases, the heat capacity of the elongated bodies becomes smaller than the heat capacity of the viscous body or the viscoelastic body, so that the heat generated in the viscous body or the viscoelastic body fails to escape efficiently and speedily through the elongated bodies. Hence, a temperature rise of the viscous body or the viscoelastic body itself occurs, and there is a possibility that the intended damping force fails to be generated.

Furthermore, in the damper in accordance with the invention, from the perspective of not causing the temperature rise in the viscous body or the viscoelastic body itself, the ratio (t/d) should preferably be not less than 0.5. However, if the ratio (t/d) becomes greater than 8, the damper becomes large in weight and diameter, as described above. Furthermore, large pressure fluctuations occur in the viscous body or the viscoelastic body in slight axial movement of the inner elongated body with respect to the outer elongated body, and it becomes difficult to efficiently damp the vibration of the building or the like due to the earthquake.

Accordingly, with this damper, since the product (d·t) is not less than 10 and not more than 100, and the ratio (t/d) is not less than 0.5 and not more than 8, the strength is sufficiently ensured irrespective of the magnitude of the thickness d. Moreover, it becomes possible to provide the damper having the weight and diameter corresponding to the magnitude of the damping force generated. Further, it is possible to allow the heat generated in the viscous body or the viscoelastic body to escape efficiently and speedily through the elongated bodies and eliminate a temperature rise of the viscous body or the viscoelastic body itself, thereby making it possible to generate an intended damping force. Additionally, since large pressure fluctuations are not caused in the viscous body or the viscoelastic body even in the relative axial movement of the inner elongated body with respect to the outer elongated body, it becomes possible to efficiently damp the vibration of the building or the like caused by the earthquake.

The damper according to another aspect of the invention comprises: a hollow outer elongated body, an inner elongated body, and at least one hollow intermediate elongated body, the intermediate elongated body including an inserted portion which has an outer surface extending in an axial direction and disposed with a gap with respect to an axially extending inner surface of the outer elongated body, and which is inserted in the outer elongated body so as to be relatively movable in the axial direction, the inner elongated body including an inserted portion which has an outer surface extending in the axial direction and disposed with a gap with respect to an axially extending inner surface of the intermediate elongated body, and which is inserted in the intermediate elongated body so as to be relatively movable in the axial direction, a viscous body or a viscoelastic body being disposed in the respective gaps between the inner surface of the outer elongated body and the outer surface of the intermediate elongated body and between the inner surface of the intermediate elongated body and the outer surface of the inner elongated body in such a manner as to be in contact with the inner surfaces and the outer surfaces.

In accordance with the damper according to this aspect, by connecting this damper to such as columns and horizontal members by means of the respective attaching plate members, in the relative vibration of, for instance, the lower horizontal member with respect to the upper horizontal member in a horizontal direction within the plane of the wall space owing to an earthquake or the like, the viscous body or the viscoelastic body is caused to undergo viscous shear deformation by the relative axial movement of the intermediate elongated body with respect to the outer elongated body and by the relative axial movement of the inner elongated body with respect to the intermediate elongated body. Accordingly, it is possible to more effectively absorb the relative vibrational energy as compared with the damper according to the above-described aspect. In other words, it is possible to obtain the damping force based on the viscous body or the viscoelastic body disposed in the gap between the inner surface of the intermediate elongated body and the outer surface of the inner elongated body, in addition to the damping force based on the viscous body or the viscoelastic body disposed in the gap between the inner surface of the outer elongated body and the outer surface of the intermediate elongated body. As a result, the damping force generated can be increased without enlarging the occupying space in the axial direction and the weight and without causing an undesirable situation such as the mutual contact between the elongated bodies attributable to an extremely narrow gap.

In the case where the filled viscous body or viscoelastic body is set in a hermetically sealed state, the damper according to this aspect should preferably further comprise: control means for controlling an increase or decrease of the internal pressure of the viscous body or the viscoelastic body due to the extension or retraction of the intermediate elongated body with respect to an interior of the outer elongated body and the extension or retraction of the inner elongated body with respect to an interior of the intermediate elongated body.

Also in the damper according to this other aspect, at least one of the gaps and at least one of the outer and the inner elongated bodies and the intermediate elongated body should preferably have the relationship of the aforementioned formulae (1) and (2). In the case of this embodiment, d is the thickness of at least one of the gaps in a direction perpendicular to the axial direction, and t is the thickness of at least one of the outer and the inner elongated bodies and the intermediate elongated body in the direction perpendicular to the axial direction.

In the invention, the damper may be constructed by respectively single outer, inner, and intermediate elongated bodies. Alternatively, however, the damper may be constructed by providing a plurality of sets of the outer elongated body, at least one hollow intermediate elongated body, and the inner elongated body, by integrating the plurality of outer elongated bodies by being secured to each other, by using the one-side attaching plate member in common by being secured to respective other end portions of the plurality of outer elongated bodies and respective one end portions of the inner elongated bodies, respectively, and by using the other-side attaching plate member in common by being secured to respective one end portions of the plurality of intermediate elongated bodies.

In this damper as well, the one-side attaching plate member may be secured to the other end portion of the outer elongated body and the one end portion of the inner elongated body by means of a collar member or a cover member. In this case as well, it suffices if the collar member or the cover member is secured to the other end portion of the outer elongated body and the one end portion of the inner elongated body by welding or the like, and the one-side attaching plate member is secured to the collar member or the cover member by welding, bolts or the like.

In the damper in accordance with the invention, it suffices if the collar member or the cover member is secured to the one end portion of the intermediate elongated body by welding or the like, and the other-side attaching plate member is secured to the collar member or the cover member by welding, bolts or the like.

The damper according to still another aspect of the invention comprises: a hollow outer elongated body, an inner elongated body, and at least two hollow intermediate elongated bodies, one of the intermediate elongated bodies including an inserted portion which has an outer surface extending in an axial direction and disposed with a gap with respect to an axially extending inner surface of the outer elongated body, and which is inserted in the outer elongated body so as to be relatively movable in the axial direction, another one of the intermediate elongated bodies including an inserted portion which has an outer surface extending in the axial direction and disposed with a gap with respect to an axially extending inner surface of the one intermediate elongated body, and which is inserted in the one intermediate elongated body so as to be relatively movable in the axial direction, the inner elongated body including an inserted portion which has an outer surface extending in the axial direction and disposed with a gap with respect to an axially extending inner surface of the other intermediate elongated body, and which is inserted in the other intermediate elongated body so as to be relatively movable in the axial direction, a viscous body or a viscoelastic body being disposed in the respective gaps between the inner surface of the outer elongated body and the outer surface of the intermediate elongated body, between the inner surface of the one intermediate elongated body and the outer surface of the other intermediate elongated body, and between the inner surface of the other intermediate elongated body and the outer surface of the inner elongated body in such a manner as to be in contact with the inner surfaces and the outer surfaces.

In accordance with the damper according to this aspect, in the same way as the dampers according to the above-described aspects, by connecting this damper to such as columns and horizontal members by means of the respective attaching plate members, in the relative vibration of, for instance, the lower horizontal member with respect to the upper horizontal member in a horizontal direction within the plane of the wall space owing to an earthquake or the like, the viscous body or the viscoelastic body is caused to undergo viscous shear deformation by the relative axial movement of the one intermediate elongated body and the inner elongated body with respect to the outer elongated body and the other intermediate elongated body. Accordingly, it is possible to far more effectively absorb the relative vibrational energy as compared with the dampers according to the first and the other aspects. As a result, the damping force generated can be increased without enlarging the occupying space in the axial direction and the weight and without causing an undesirable situation such as the contact among the outer and inner elongated bodies and the at least two hollow intermediate elongated bodies.

In the case where the filled viscous body or viscoelastic body is set in a hermetically sealed state, the damper according to this aspect should also preferably further comprise: control means for controlling an increase or decrease of the internal pressure of the viscous body or the viscoelastic body due to the extension or retraction of the one intermediate elongated body and the inner elongated body, respectively, with respect to respective interiors of the outer elongated body and the other intermediate elongated body.

Also in the damper according to this aspect, at least one of the three gaps and at least one of the outer and the inner elongated bodies and the at least two intermediate elongated body should preferably have the relationship of the aforementioned formulae (1) and (2). In the case of this embodiment, d is the thickness of at least one of the three gaps in a direction perpendicular to the axial direction, and t is the thickness of at least one of the outer and the inner elongated bodies and the at least two intermediate elongated bodies in the direction perpendicular to the axial direction.

In the damper according to this aspect as well, the damper may be constructed by respectively single elongated bodies of the outer and inner elongated bodies and two intermediate elongated bodies. Alternatively, however, the damper may be constructed by providing a plurality of sets of the outer elongated body, at least two hollow intermediate elongated bodies, and the inner elongated body, by integrating the plurality of outer elongated bodies by being secured to each other, by using the one-side attaching plate member in common by being secured to respective other end portions of the plurality of outer elongated bodies and respective one end portions of the plurality of other intermediate elongated bodies, and by using the other-side attaching plate member in common by being secured to respective one end portions of the plurality of one intermediate elongated bodies and respective one end portions of the plurality of inner elongated bodies.

In the damper according to this aspect as well, the one-side attaching plate member may be secured to the other end portion of the outer elongated body and the one end portion of the other intermediate elongated body by means of a collar member or a cover member. In this case as well, it suffices if the collar member or the cover member is secured to the other end portion of the outer elongated body and the one end portion of the other intermediate elongated body by welding or the like, and the one-side attaching plate member is secured to the collar member or the cover member by welding, bolts or the like.

In this damper as well, it suffices if the collar member or the cover member is secured to the one end portion of the one intermediate elongated body and the one end portion of the inner elongated body by welding or the like, and the other-side attaching plate member is secured to the collar member or the cover member by welding, bolts or the like.

It should be noted that the damper in accordance with the invention is rigidly connected to the columns and the horizontal members by means of the attaching plate member, for instance, in the direction within the wall plane. However, in the relative vibration of the lower horizontal member in the horizontal direction within the wall plane with respect to the upper horizontal member due to an earthquake, the damper in accordance with the invention may be adapted to follow this relative vibration by the mutual relative axial movement of the outer elongated body and the inner elongated body, by the mutual relative axial movement of the outer elongated body and the inner elongated body, on the one hand, and the intermediate elongated body, on the other hand, or by the mutual relative axial movement of the outer elongated body and the other intermediate elongated body, on the one hand, and the one intermediate elongated body and the inner elongated body, on the other hand, and additionally by slight deflection of the respective elongated bodies.

The vibration damping structure in accordance with the invention comprises the damper, wherein the damper is connected to a column or a horizontal member by means of the one-side attaching plate member and one connecting means secured to the one-side attaching plate member, and is connected to a column or a horizontal member by means of the other-side attaching plate member and another connecting means secured to the other-side attaching plate member.

According to this vibration damping structure, as a result of the fact that the damper is connected to the columns or the horizontal members by means of the attaching plate members and the connecting means, the building can be damped, and it is possible to minimize damages due to an earthquake.

The vibration damping structure according to another aspect has the damper, and the damper is connected to a column or a horizontal member by means of the one-side attaching means and one connecting means attached to the one-side attaching means, and is connected to a horizontal member or a column by means of the other-side attaching means and another connecting means attached to the other-side attaching means.

According to the vibration damping structure of this aspect, as a result of the fact that the damper is connected to the columns or the horizontal members by means of the respective connecting means, the building can be damped, and it is possible to minimize damages due to an earthquake.

The buildings to which the damper of the invention is applied include both public and private enterprise-use or office buildings, multiple dwelling houses including apartment houses, detached houses, and the like, and may be either newly constructed or existing buildings.

As the viscous body used in the invention, one whose viscosity at 30° C. is 1000 Pa·s to 50,000 Pa·s is preferable. In addition, as the viscoelastic body used in the invention, one whose coefficient of equivalent viscous damping is 20% to 50% is preferable. In the present invention, however, the viscous body or the viscoelastic body is not necessarily limited to the same, and it suffices if the viscous body or the viscoelastic body is capable of obtaining the above-described effects. Further, the viscous body used in the invention may specifically be such a viscous body as ordinary silicone oil or the like. However, as preferable examples, it is possible to cite high molecular viscous bodies such as polyisobutylene, polypropylene, polybutane, dimethylpolysiloxane, and the like, or asphalt or the like, but it is possible to use other viscous bodies. In addition, as the viscoelastic body used in the invention, it is possible to specifically cite, by way of example, natural rubber, synthetic rubber, polybutadiene, liquid synthetic rubber such as polyisoprene, one mixed with the aforementioned viscous body, and the like. However, other viscoelastic bodies may be used.

Furthermore, in the invention, spacer members may be disposed between the respective elongated bodies in such a manner as to be in contact with the elongated bodies so as to maintain the gap. Such a spacer member may be an endless annular member. Alternatively, however, separate spacer pieces which partially come into contact with the elongated bodies may be used. As a preferable specific example of the depth d of the gap, it is possible to cite 1 mm to 5.5 mm or thereabouts.

In accordance with the present invention, it is possible to provide a damper which with a simple construction can be installed in a wall in the form of a diagonal brace or installed on a column in such a manner as to extend in parallel to the column in a vertical direction, and which is capable of reducing the cost, and does not produce abnormal noise in shaking, as well as a vibration damping structure using the same.

In addition, in accordance with the present invention, it is possible to provide a damper which is capable of generating a large damping force without enlarging the occupying space in the axial direction and the weight and without causing an undesirable situation such as contact between the elongated bodies, as well as a vibration damping structure using the same.

Hereafter, a more detailed description will be given of the present invention and the mode for carrying it out with reference to the preferred embodiments shown in the drawings. It should be noted that the present invention is not limited to these embodiments.

EMBODIMENTS

Figure 1:
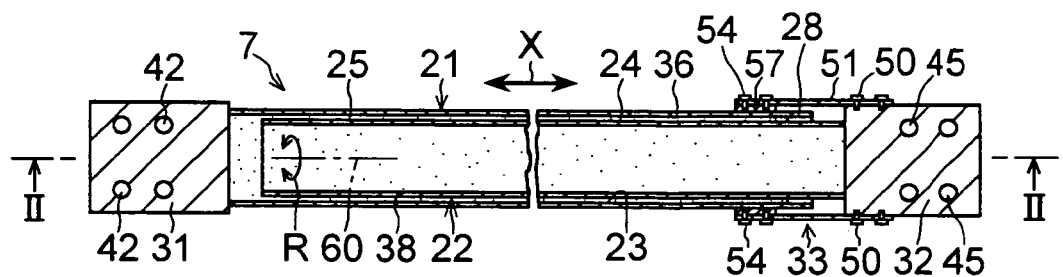
FIG. 1 is a cross-sectional view, taken in the direction of arrows along line I-I shown in FIG. 2, of a preferred embodiment in accordance with the invention.
Figure 2:
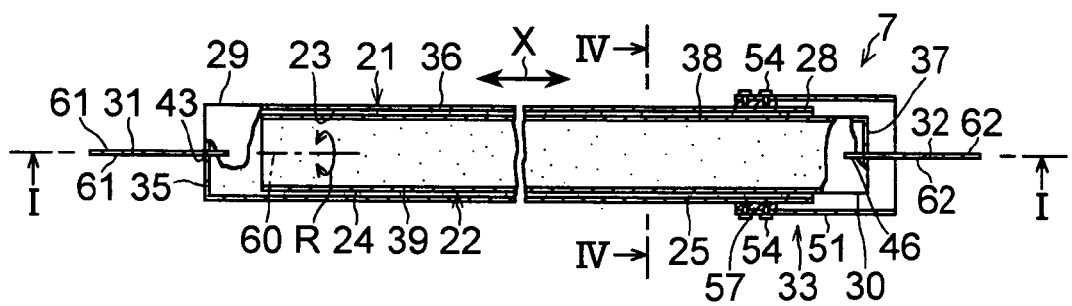
FIG. 2 is a cross-sectional view, taken in the direction of arrows along line II-II, of the embodiment shown in FIG. 1.
Figure 3:
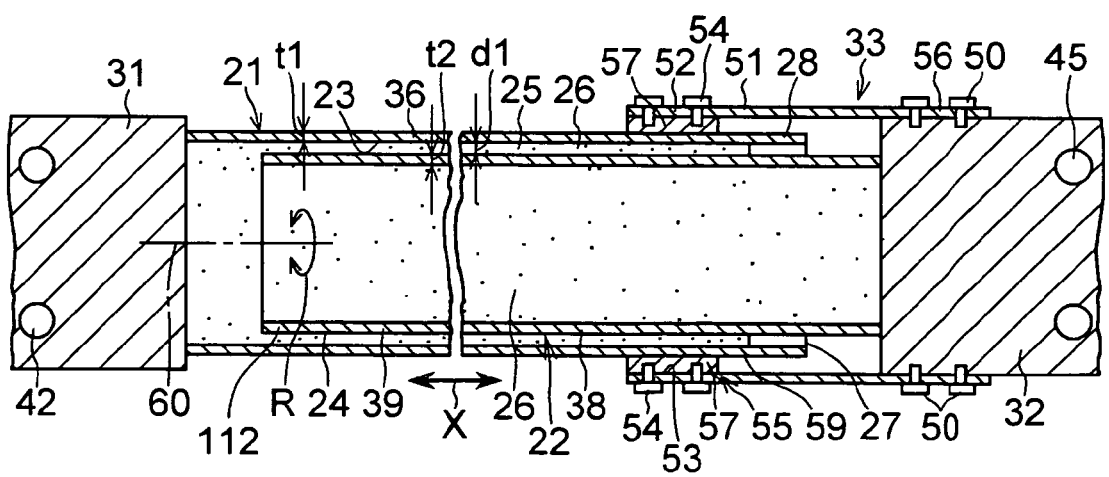
FIG. 3 is a partially enlarged cross-sectional view of the embodiment shown in FIG. 1.
Figure 4:
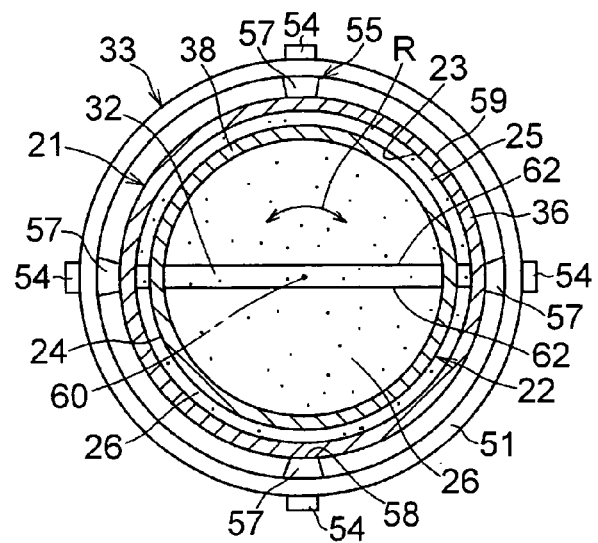
FIG. 4 is a cross-sectional view, taken in the direction of arrows along line IV-IV shown in FIG. 2, of the embodiment shown in FIG. 1.

In FIGS. 1 to 6, a damping wall structure 1 as a vibration damping structure in accordance with this embodiment has a damper 7 which is capable of extending and contracting in an axial direction X and is disposed in the form of a diagonal brace in a wall space 6 defined by left and right columns 2 and 3 and upper and lower horizontal members 4 and 5 of a building.

The building in this embodiment is a high-rise building. Dampers, although not shown, are similarly disposed, as required, in the form of diagonal braces in wall spaces of the same story adjacent to the wall space 6 in this predetermined story and in wall spaces in stories higher and lower than this predetermined story, in addition to the wall space 6 in a predetermined story. In addition, although in the illustrated example, one damper 7 is disposed in the wall space 6, two or more dampers 7 may be disposed.

The damper 7 includes a hollow outer elongated body 21 formed of a cylindrical member; a hollow inner elongated body 22 similarly formed of a cylindrical member; a viscous body or a viscoelastic body, i.e., a viscous body 26 in this embodiment, which is disposed in a cylindrical gap 25 between a cylindrical inner surface 23 of the elongated body 21 and a cylindrical outer surface 24 of the elongated body 22 in such a manner as to be in contact with the inner surface 23 and the outer surface 24 of these elongated bodies 21 and 22, respectively; rectangular attaching plate members 31 and 32 which are respectively secured to a closed-side other end portion 29, in the axial direction X, of the elongated body 21 having one end portion 28 on an open end 27 side and to a closed-side one end portion 30 of the elongated body 22, respectively; and a holding means 33 for holding the gap 25 between the inner surface 23 of the elongated body 21 at the one end portion 28 of the elongated body 21 and the outer surface 24 of the elongated body 22.

The elongated body 21 consists of a bottomed cylindrical member having a disk-shaped bottom portion 35 and a hollow cylindrical portion 36 which is formed integrally with the bottom portion 35 and whose other end portion 29 side is closed by the bottom portion 35. The elongated body 22 similarly consists of a bottomed cylindrical member having a disk-shaped bottom portion 37 and a hollow cylindrical portion 38 which is formed integrally with the bottom portion 37 and whose one end portion 30 side is closed by the bottom portion 37. The hollow cylindrical portion 38 of such an elongated body 22 includes an inserted portion 39 which has the cylindrical outer surface 24 extending in the axial direction X and disposed with the gap 25 with respect to the inner surface 23, extending in the axial direction X, of the hollow cylindrical portion 36 of the elongated body 21, and which is inserted in the hollow cylindrical portion 36 of the elongated body 21 so as to be relatively movable in the axial direction X. Further, the hollow cylindrical portion 38 of the elongated body 22 includes the one end portion 30 which integrally extends from the inserted portion 39 in the axial direction and projects to the outside from the one end portion 28, in the axial direction X, of the hollow cylindrical portion 36 of the elongated body 21.

The viscous body 26 is tightly filled in the gap 25 and additionally in the interiors of the hollow cylindrical portions 36 and 38 other than the gap 25. It should be noted that to ensure that the leakage of the viscous body 26 from the opening end 27 of the hollow cylindrical portion 36 to the outside does not occur in the relative movement of the hollow cylindrical portion 38 of the elongated body 22 in the axial direction X with respect to the hollow cylindrical portion 36 of the elongated body 21, the viscous body 26 is not fully filled up to the opening end 27 of the hollow cylindrical portion 36 in the gap 25.

The one-side attaching plate member 31, which has through holes 42 bored therein for insertion of attaching bolts 41 and constitutes one attaching means, is fitted in a slit 43 formed in the bottom portion 35 and the other end portion 29 of the hollow cylindrical portion 36 of the elongated body 21, and is secured to the bottom portion 35 and the other end portion 29 of the hollow cylindrical portion 36 of that elongated body 21 by means of welding or the like. The other-side attaching plate member 32, which has through holes 45 bored therein for insertion of attaching bolts 44 and constitutes the other attaching means, is fitted in a slit 46 formed in the bottom portion 37 and the one end portion 30 of the hollow cylindrical portion 38 of the elongated body 22, and is secured to the bottom portion 37 and the one end portion 30 of the hollow cylindrical portion 38 of that elongated body 22 by means of welding or the like.

The holding means 33, which can also be used as a temporarily fixing means, includes a cylindrical tubular body 51; and spacer members 55 secured to an inner surface 53 of one end portion 52, in the axial direction, of the tubular body 51 by means of bolts 54. The tubular body 51 at its other end portion 56 in the axial direction X is secured to the attaching plate member 32 by means of bolts 50. The spacer members 55 consist of four spacer pieces 57 disposed at equal distances in the circumferential direction of the tubular body 51. Each spacer piece 57 is interposed between the one end portion 28, in the axial direction X, of the elongated body 21 and the one end portion 52 of the tubular body 51, such that its inner surface 58 is in contact with an outer surface 59 of the one end portion 28 of the hollow cylindrical portion 36 of the elongated body 21 so as to be relatively slidable in the axial direction X and in a direction R about an axis 60. Thus, the spacer members 55 consisting of the four spacer pieces 57 are adapted to be partially brought into contact with the outer surface 59 of the one end portion 28 of the hollow cylindrical portion 36 of the elongated body 21.

As described above, the elongated body 21 and the elongated body 22 are relatively movable with respect to each other in the axial direction X. Moreover, a wide attaching surface 61 of the attaching plate member 31 secured to the elongated body 21 is substantially parallel to a wide attaching surface 62 of the attaching plate member 32 secured to the elongated body 22. It should be noted that, in this embodiment, the elongated body 21 and the elongated body 22 are relatively rotatable about the axis 60 in the direction R with respect to each other.

In the damper 7, if it is assumed that the thickness of the gap 25 in a direction perpendicular to the axial direction is d1, that the thickness of the hollow cylindrical portion, in the direction perpendicular to the axial direction, of at least one of the outer and inner elongated bodies 21 and 22, i.e., the hollow cylindrical portion 36 of the elongated body 21 in this embodiment, is t1, and that the thickness of the hollow cylindrical portion 38 of the elongated body 22 in the direction perpendicular to the axial direction is t2, then the thickness d1 and the thicknesses t1 and t2 have the relationships of the following formulae (3) to (6):

$$10 \leq d1 \cdot t1 \leq 100 \quad (3)$$

$$0.5 \leq t1/d1 \leq 8 \quad (4)$$

$$10 \leq d1 \cdot t2 \leq 100 \quad (5)$$

$$0.5 \leq t2/d1 \leq 8 \quad (6)$$

The above-described damper 7 is connected to the column or the horizontal member, i.e., the lower horizontal member 5 in this embodiment, by means of the attaching plate member 31 and a connecting means 65 secured to the attaching plate member 31, and to the column or the horizontal member, i.e., the upper horizontal member 4 in this embodiment, by means of the attaching plate member 32 and a connecting means 66 secured to the attaching plate member 32, respectively. The wide attaching surfaces 61 and 62 of both attaching plate members 31 and 32 are disposed in parallel to the plane of the wall space 6.

The connecting means 65 includes at least one pair of splice plates, i.e., two pairs of splice plates 72 and 73 in this embodiment, for clamping at their one end portions 71 the attaching plate member 31 at the wide attaching surfaces 61 of the attaching plate member 31; and bolts 41 inserted in the through holes 42 to fasten the one end portions 71 of the pairs of splice plates 72 and 73 onto the attaching plate member 31. The other end portions 74 of the pairs of splice plates 72 and 73 are secured by the bolts 41 to a bracket 75 secured to the lower horizontal member 5 by welding, bolts, or the like.

The connecting means 66 includes at least one pair of splice plates, i.e., two pairs of splice plates 82 (one pair of splice plates are not shown) in this embodiment, for clamping at their one end portions 81 the attaching plate member 32 at the wide attaching surfaces 62 of the attaching plate member 32; and bolts 44 inserted in the through holes 45 to fasten the one end portions 81 of the pairs of splice plates 82 onto the attaching plate member 32. The other end portions 84 of the pairs of splice plates 82 are secured by the bolts 44 to a bracket 85 secured to the upper horizontal member 4 by welding, bolts, or the like.

In the above-described damping wall structure 1, the elongated body 22 is relatively moved in the axial direction X with respect to the elongated body 21 in the relative vibration of the lower horizontal member 5 with respect to the upper horizontal member 4 in a horizontal direction H within the plane of the wall space 6 owing to an earthquake or the like. In consequence, the viscous body 26 disposed in the gap 25 is caused to undergo viscous shear deformation and is capable of absorbing the relative vibrational energy, thereby making it possible to damp at an early period the vibration of the building caused by the earthquake or the like. Moreover, in the relative vibration of the columns 2 and 3 and the upper and lower horizontal members 4 and 5 in an out-of-plane direction (in a direction perpendicular to the plane of the drawing in FIG. 5), it is possible to follow such relative vibration without much strain by means of easy deflection of both attaching plate members 31 and 32 in the out-of-plane direction. Consequently, it is possible to exhibit a desired damping effect. Further, the damper 7 is connected to the upper and lower horizontal members 4 and 5, respectively, through frictional joining by using, instead of the swivel fittings, the splice plates 72, 73, and 82 for clamping the attaching-plate members 31 and 32 at the wide attaching surfaces 61 and 62 of the attaching plate members 31 and 32, respectively. Therefore, abnormal noise does not occur, and looseness in installation does not occur. Additionally, it is possible to attain low cost, and the connection is firm despite a simple construction.

In the damping wall structure 1, by virtue of the frictional joining between the splice plates 72, 73, and 82 and the attaching plate members 31 and 32 and the frictional joining between the splice plates 72, 73, and 82 and the brackets 75 and 85, it is possible to attain firmer connection of the damper 7. Furthermore, the operation of installing the damper 7 in the wall space 6 can be simplified, the operating time can be reduced substantially, and the replacement of the damper 7 can be effected easily.

In the damping wall structure 1, as a result of the fact that the wide attaching surfaces 61 and 62 of the attaching plate members 31 and 31 are disposed in parallel to the plane of the wall space 6, it is possible to obtain the advantages derived from the above-described damper 7, and the building can damped without narrowing the space being used.

Furthermore, with the damper 7, since the attaching plate members 31 and 32 are respectively fitted in the slits 43 and 46 formed in the elongated body 21 and the elongated body 22, and are secured to the elongated body 21 and the elongated body 22, the securing of the attaching plate members 31 and 32 to the respective elongated body 21 and elongated body 22 can be made firmer. It is thus possible to avoid a troublesome situation in which the respective attaching plate members 31 and 32 become removed from the elongated body 21 and the elongated body 22 over a long period of use.

In addition, with the damper 7, the product (d1·t1) of the thickness d1 of the gap 25 and the thickness t1 of the hollow cylindrical portion 36 is not less than 10 and not more than 100, and the ratio (t1/d1) between the thickness d1 of the gap 25 and the thickness t1 of the hollow cylindrical portion 36 is not less than 0.5 and not more than 8. Meanwhile, the product (d1·t2) of the thickness d1 of the gap 25 and the thickness t2 of the hollow cylindrical portion 38 is not less than 10 and not more than 100, and the ratio (t2/d1) between the thickness d1 of the gap 25 and the thickness t2 of the hollow cylindrical portion 38 is not less than 0.5 and not more than 8. Therefore, the strength of the hollow cylindrical portions 36 and 38 is sufficiently ensured irrespective of the magnitude of the thickness d1. Moreover, it becomes possible to provide the damper 7 having the hollow cylindrical portions 36 and 38 having the weight and diameters corresponding to the magnitude of the damping force generated. Further, it is possible to allow the heat generated in the viscous body 26 to escape efficiently and speedily through the hollow cylindrical portions 36 and 38 and eliminate a temperature rise of the viscous body 26 itself, thereby making it possible to generate an intended damping force. Additionally, since large pressure fluctuations are not caused in the viscous body 26 even in the relative movement of the elongated body 22 in the axial direction X with respect to the elongated body 21, it becomes possible to efficiently damp the vibration of the building or the like caused by the earthquake or the like.

Incidentally, although the above-described damper 7 is provided with the outer elongated body 21 and the inner elongated body 22, a damper 101 may alternatively be constructed by including a hollow elongated body 102 in addition to the elongated body 21 and the elongated body 22, as shown in FIGS. 7 to 10.

In the damper 101 shown in FIGS. 7 to 10, the elongated body 22 is an intermediate elongated body located midway between the elongated body 21 and the elongated body 102, and the elongated body 102 is an inner elongated body disposed on the inner side with respect to both of the elongated body 21 and the elongated body 22.

In the damper 101, the outer elongated body 21 has, instead of the disk-shaped bottom portion 35, an annular bottom portion 103 which is integral with the hollow cylindrical portion 36. The inner hollow elongated body 102, which is formed of a cylindrical member in the same way as the elongated body 21 and the intermediate elongated body 22, consists of a bottomed cylindrical member having a disk-shaped bottom portion 104 and a hollow cylindrical portion 106 which is formed integrally with the bottom portion 104 and whose one end portion 105 side is closed by the bottom portion 104. As for the elongated body 21, its bottom portion 103 is secured to the bottom portion 104 by welding or the like and is integrated with the elongated body 102. The hollow cylindrical portion 106 of such an elongated body 102 includes an inserted portion 110 which has a cylindrical outer surface 109 extending in the axial direction X and disposed with a gap 108 with respect to a cylindrical inner surface 107, extending in the axial direction X, of the hollow cylindrical portion 38 of the elongated body 22, and which is inserted in the hollow cylindrical portion 38 of the elongated body 22 so as to be relatively movable in the axial direction X. Further, the hollow cylindrical portion 106 of the elongated body 102 includes the one end portion 105 which integrally extends from the inserted portion 110 in the axial direction X and projects to outside the hollow cylindrical portion 38 from the other end portion 112 on an opening end 111 side, in the axial direction X, of the hollow cylindrical portion 38. The viscous body 26 is disposed in the gap 108 as well in addition to the gap 25 in such a manner as to be in contact with the inner surface 107 and the outer surface 109. The attaching plate member 31 is fitted in the slit 43 formed in the bottom portion 103 and the other end portion 29 of the hollow cylindrical portion 36 of the elongated body 21 and in a slit 113 formed in the bottom portion 104 and the one end portion 105 of the hollow cylindrical portion 106 of the elongated body 102, and is secured to the bottom portion 103 and the other end portion 29 of the hollow cylindrical portion 36 of that outer elongated body 21 and to the bottom portion 104 and the one end portion 105 of the hollow cylindrical portion 106 of the elongated body 102. The viscous body 26 is tightly filled in the gaps 25 and 108 and in the interiors of the hollow cylindrical portions 36 and 38 other than the gaps 25 and 108, and also in the interior of the hollow cylindrical portion 106.

In the damper 101, spacer pieces 121, 122, and 123 equivalent to the spacer pieces 57 of the spacer members 55 are respectively secured to the outer surface 24 of the other end portion 112 of the hollow cylindrical portion 38, the outer surface 109 on the one end portion 105 side of the hollow cylindrical portion 106, and the outer surface 109 of the other end portion 124 of the hollow cylindrical portion 106. The gaps 25 and 108 are held such that outer surfaces of the spacer pieces 121, 122, and 123 are respectively adapted to be brought into contact with the inner surface 23 of the hollow cylindrical portion 36 and the inner surface 107 of the hollow cylindrical portion 38 so as to be relatively slidable in the axial direction X and in the direction R about the axis 60.

With the damper 101 as well, the elongated bodies 21 and 102 and the elongated body 22 are relatively movable with respect to each other in the axial direction X. The wide attaching surface 61 of the attaching plate member 31 secured to the elongated bodies 21 and 102 is substantially parallel to the wide attaching surface 62 of the attaching plate member 32 secured to the elongated body 22. The elongated bodies 21 and 102 and the elongated body 22 in this embodiment are relatively rotatable about the axis 60 in the direction R with respect to each other.

Furthermore, in the damper 101 as well, if it is assumed that the thickness of the gap 25 in the direction perpendicular to the axial direction is d1, that the thickness of the gap 108 in the direction perpendicular to the axial direction is d2, and that the thickness of the hollow cylindrical portion, in the direction perpendicular to the axial direction, of at least one of the outer and inner elongated bodies 21 and 102 and the intermediate elongated body 22, i.e., the thicknesses of the hollow cylindrical portions 36, 38, and 106 of the elongated bodies 21, 22, and 102 in this embodiment, are t1, t2, and t3, respectively, then the thicknesses d1 and d2 and the thicknesses t1, t2, and t3 have the relationships of the following formulae (7) to (14):

$$10 \leq d1 \cdot t1 \leq 100 \quad (7)$$

$$0.5 \leq t1/d1 \leq 8 \quad (8)$$

$$10 \leq d1 \cdot t2 \leq 100 \quad (9)$$

$$0.5 \leq t2/d1 \leq 8 \quad (10)$$

$$10 \leq d2 \cdot t2 \leq 100 \quad (11)$$

$$0.5 \leq t2/d2 \leq 8 \quad (12)$$

$$10 \leq d2 \cdot t3 \leq 100 \quad (13)$$

$$0.5 \leq t3/d2 \leq 8 \quad (14)$$

Figure 5:
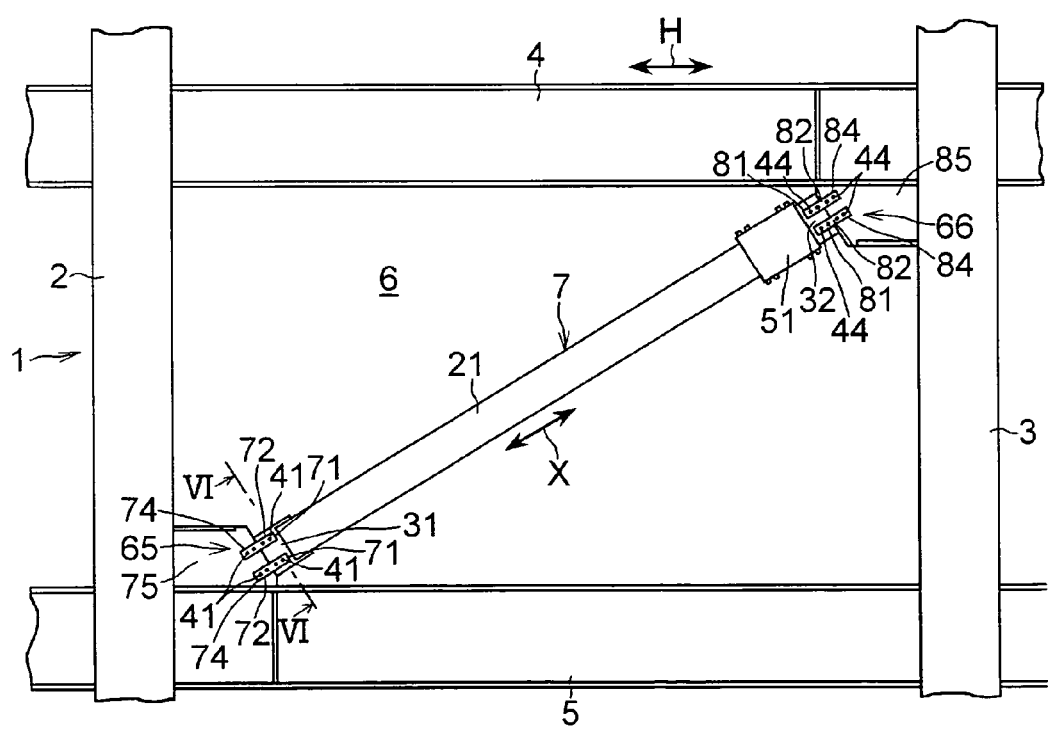
FIG. 5 is an explanatory diagram of the preferred embodiment in accordance with the invention using the example shown in FIG. 1.
Figure 6:
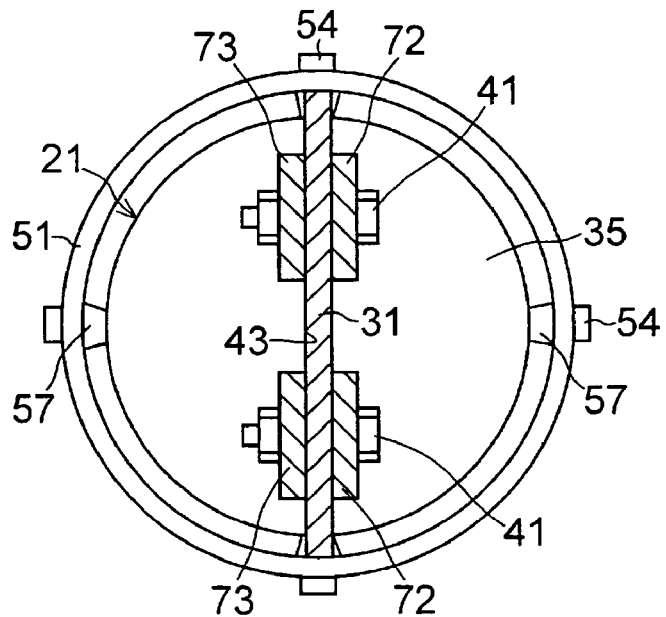
FIG. 6 is a cross-sectional view, taken in the direction of arrows along line VI-VI, of the embodiment shown in FIG. 5.
Figure 7:
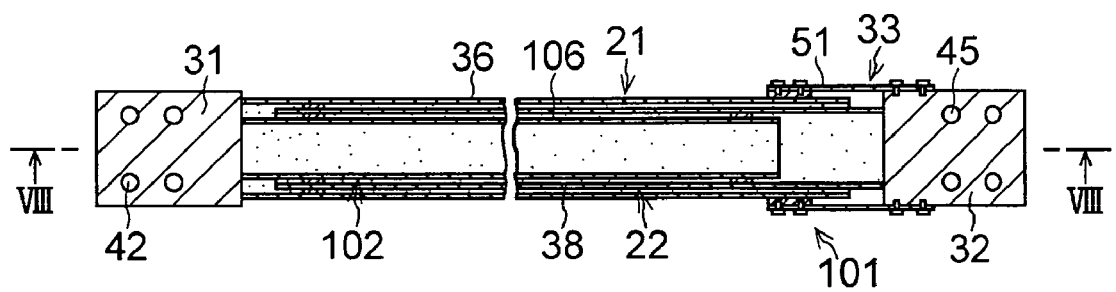
FIG. 7 is a cross-sectional view, taken in the direction of arrows along line VII-VII shown in FIG. 8, of another preferred embodiment in accordance with the invention.
Figure 8:
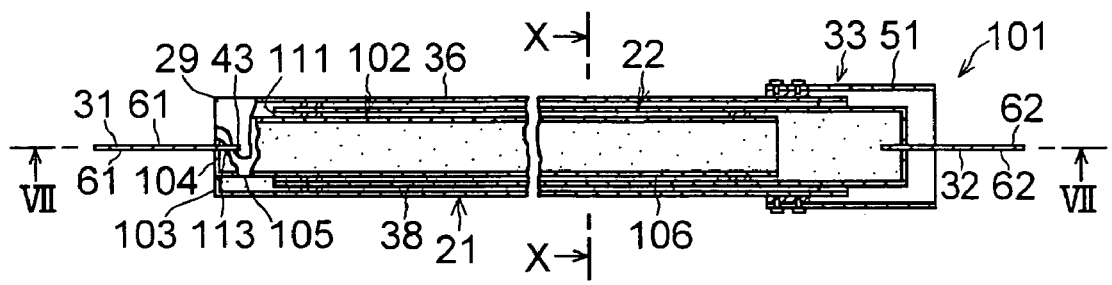
FIG. 8 is a cross-sectional view, taken in the direction of arrows along line VIII-VIII, of the embodiment shown in FIG. 7.
Figure 9:
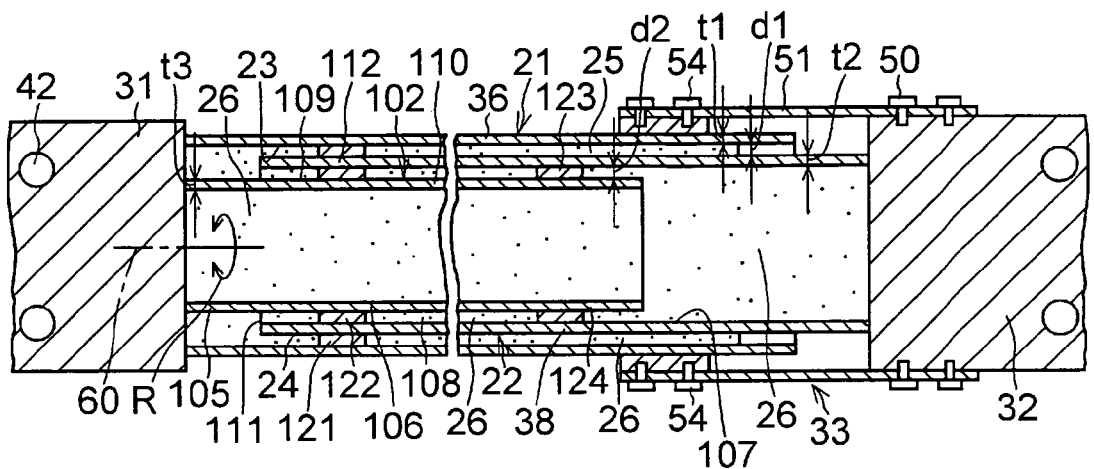
FIG. 9 is a partially enlarged cross-sectional view of the embodiment shown in FIG. 7.
Figure 10:
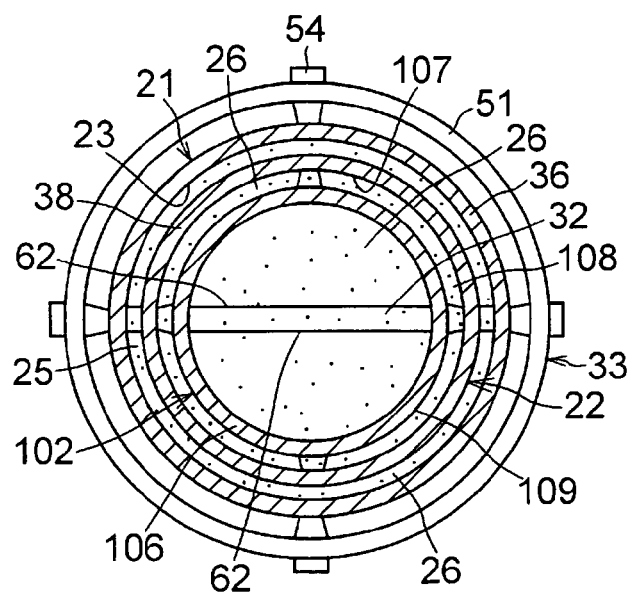
FIG. 10 is a cross-sectional view, taken in the direction of arrows along line X-X shown in FIG. 8, of the embodiment shown in FIG. 7.

In the same way as the damper 7, the above-described damper 101 is used in the damping wall structure 1 in place of the damper 7 by being connected to the lower horizontal member 5 by means of the connecting means 65 shown in FIG. 5 and to the upper horizontal member 4 by means of the connecting means 66, respectively, such that the wide attaching surfaces 61 and 62 of both attaching plate members 31 and 32 are disposed in parallel to the plane of the wall space 6.

With the damping wall structure 1 having the damper 101, it is possible to obtain the advantages in the same way as the above-described damping wall structure 1 having the damper 7. Moreover, in the relative movement of the elongated body 22 in the axial direction X with respect to the elongated bodies 21 and 102 due to an earthquake or the like, viscous shear deformation is caused to occur not only in the viscous body 26 disposed in the gap 25 but also in the viscous body 26 disposed in the gap 108, making it possible to absorb the relative vibrational energy. In consequence, it is possible to damp at an early period the vibration of the building caused by the earthquake or the like. In addition, with the damper 101, in the same way as the damper 7, the securing of the attaching plate members 31 and 32 to the respective elongated bodies 21, 22, and 102 can be made firmer. It is thus possible to avoid the troublesome situation in which the respective attaching plate members 31 and 32 become removed from the elongated bodies 21, 22, and 102 over a long period of use.

Further, with the damper 101, the strength of the hollow cylindrical portions 36, 38, and 106 of the elongated bodies 21, 22, and 102 is sufficiently ensured irrespective of the magnitudes of the thicknesses d1 and d2. Moreover, it becomes possible to provide the damper 101 having the hollow cylindrical portions 36, 38, and 106 having the weight and diameters corresponding to the magnitude of the damping force generated. Further, it is possible to allow the heat generated in the viscous body 26 to escape efficiently and speedily through the hollow cylindrical portions 36, 38, and 106 of the elongated bodies 21, 22, and 102 and eliminate a temperature rise of the viscous body 26 itself, thereby making it possible to generate an intended damping force. Additionally, since large pressure fluctuations are not caused in the viscous body 26 even in the relative movement of the elongated body 22 in the axial direction X with respect to the elongated bodies 21 and 102, it becomes possible to efficiently damp the vibration of the building or the like caused by the earthquake or the like.

Figure 11:
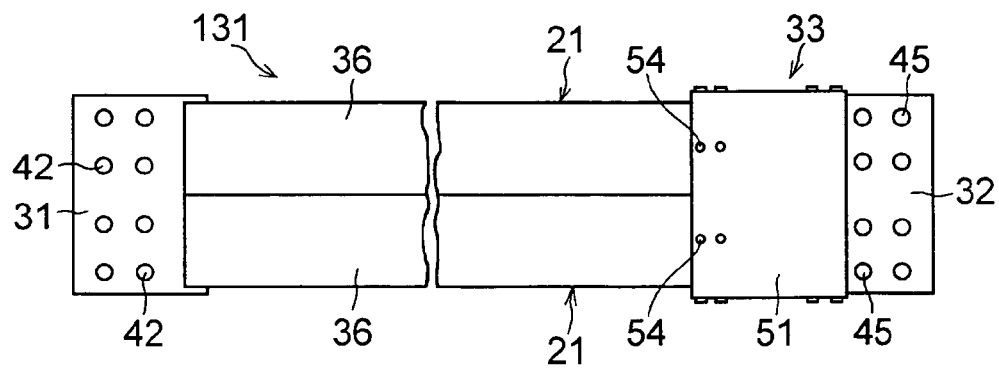
FIG. 11 is an external view of still another preferred embodiment in accordance with the invention.
Figure 12:
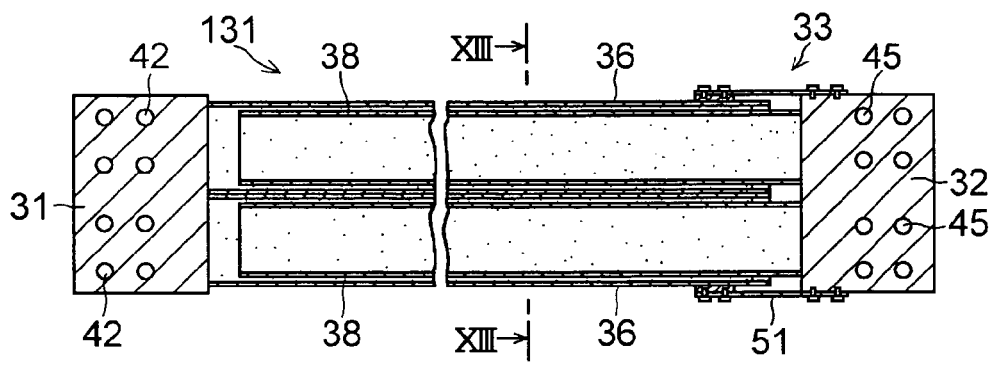
FIG. 12 is a cross-sectional view of the embodiment shown in FIG. 11.
Figure 13:
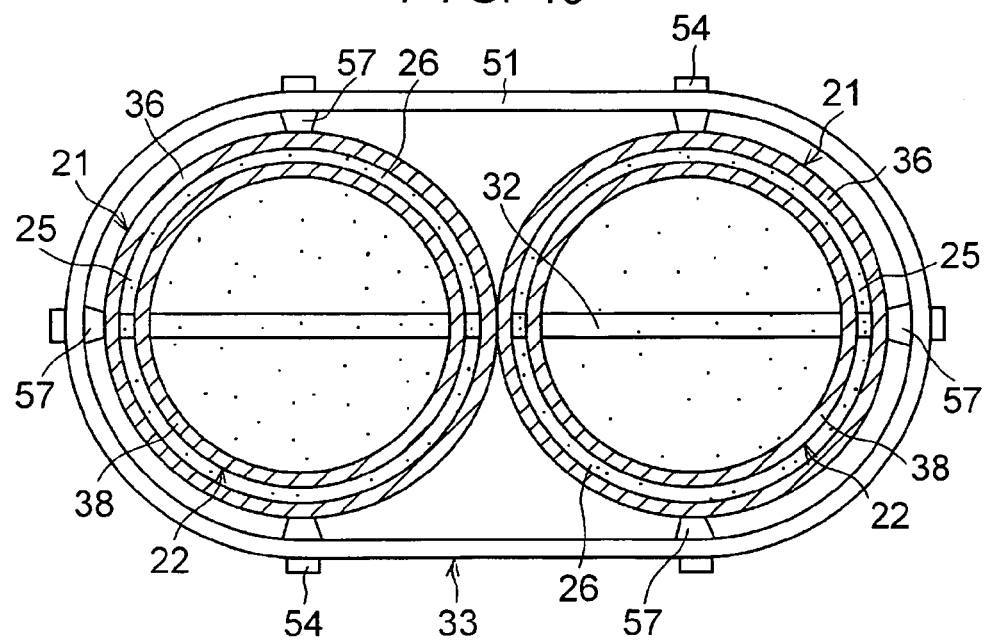
FIG. 13 is a cross-sectional view, taken in the direction of arrows along line XIII-XIII shown in FIG. 12, of the embodiment shown in FIG. 11.

A description has been given above of the damper 7 having a single elongated body 21 and a single elongated body 22 or the damper 101 having single elongated bodies 21, 22, 102, respectively. Alternatively, however, a plurality of sets of the elongated body 21 and the elongated body 22 or a plurality of sets of the elongated bodies 21, 22, and 102 may be provided, or a plurality of sets of the elongated bodies 21, 22, 102, and 202, which will be described later, e.g., two sets of the elongated body 21 and the elongated body 22, may be provided so as to make up a damper 131, as shown in FIGS. 11 to 13. In the damper 131 shown in FIGS. 11 to 13, the two elongated bodies 21 are integrated by being secured to each other by welding or the like. The attaching plate member 31 is used in common for the respective elongated bodies 21 by being secured to the respective elongated bodies 21 in the same way as described above. The attaching plate member 32 is also used in common for the respective elongated bodies 22 by being secured to the respective elongated bodies 22 in the same way as described above.

In the damper 131, the tubular body 51 of the holding means 33 has an elliptical shape instead of the cylindrical shape, and is used in common for the respective elongated bodies 21 and 22 by surrounding the one end portions 28 of the elongated bodies 21 and 22 in the same way as the attaching plate members 31 and 32.

In the same way as the damper 7, the above-described damper 131 can also be used in the damping wall structure 1 in place of the damper 7 by being connected to the lower horizontal member 5 by means of the connecting means 65 and to the upper horizontal member 4 by means of the connecting means 66, respectively, such that the wide attaching surfaces 61 and 62 of both attaching plate members 31 and 32 are disposed in parallel to the plane of the wall space 6. Also with the damping wall structure 1 having the damper 131, in the relative movement of the two elongated bodies 22 in the axial direction X with respect to the two elongated bodies 21 due to an earthquake or the like, viscous shear deformation is caused to occur in the viscous body 26 disposed in the two gaps 25, making it possible to absorb the relative vibrational energy. In consequence, it is possible to damp at an early period the vibration of the building caused by the earthquake or the like. The same applies to the cases of dampers having a plurality of sets of the elongated bodies 21, 22, and 102 and a plurality of sets of the elongated bodies 21, 22, 102, and 202.

In each of the above-described dampers 7, 101, and 131, the opening end 27 of the elongated body 21 is set in an open state as it is. However, to prevent the entry of rainwater and dust into the gap 25 from the opening end 27, in a case where, for example, the opening end 27 is sealed by a sealing member 141 to hermetically seal the viscous body 26 in the damper 7, as shown in FIG. 14, the damper 7 may be constructed by including a control means 142 for controlling an increase or decrease of the internal pressure of the viscous body 26 in the extension or retraction of the inserted portion 39 of the elongated body 22 in the axial direction X with respect to the interior of the elongated body 21.

Figure 14:
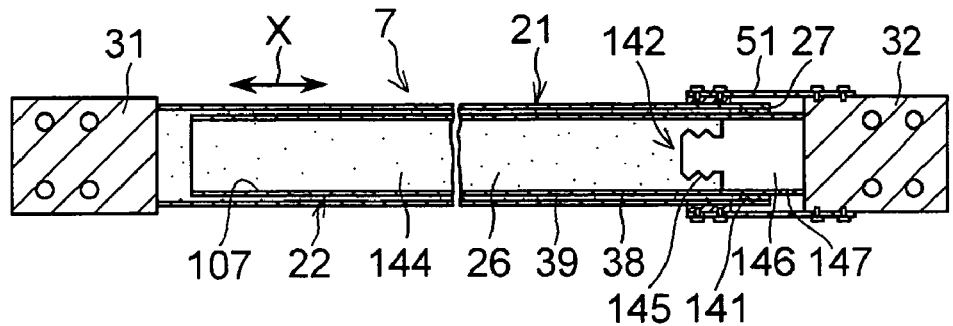
FIG. 14 is an explanatory cross-sectional view of a further preferred embodiment in accordance with the invention.

The control means 142 shown in FIG. 14 has a bellows-like flexible partition wall 145 made of a rubber member or the like for partitioning the interior of the hollow cylindrical portion 38 which is a hollow portion of the elongated body 22 into a chamber 144 with the viscous body 26 filled therein and an air chamber 146, and for increasing or decreasing the volume of the chamber 144 by the increase or decrease of the internal pressure of the viscous body 26. An outer peripheral end of the flexible partition wall 145 is secured to the inner surface 107 of the hollow cylindrical portion 38. In the case of such a control means 142, the air chamber 146, which is an interior of the hollow cylindrical portion 38 and is adjacent to the chamber 144 partitioned by the flexible partition wall 145, may be filled with air and may be hermetically sealed. If necessary, however, a through hole 147 may be bored in the hollow cylindrical portion 38 to allow the air chamber 146 to communicate with the outside.

In each of the dampers 7 and 101, instead of disposing the flexible partition wall 145 in the interior of the hollow cylindrical portion 38 by securing the outer peripheral end of the flexible partition wall 145 to the inner surface 107 of the hollow cylindrical portion 38, the flexible partition wall 145 may be disposed in the interior of the hollow cylindrical portion 36 by securing the outer peripheral end of the flexible partition wall 145 to the inner surface 23 of the hollow cylindrical portion 36. In short, it suffices if the flexible partition wall 145 is disposed in the damper 7 or 101 so as to form the air chamber 146 capable of controlling the increase or decrease of the internal pressure of the viscous body 26 in the operation.

Figure 15:
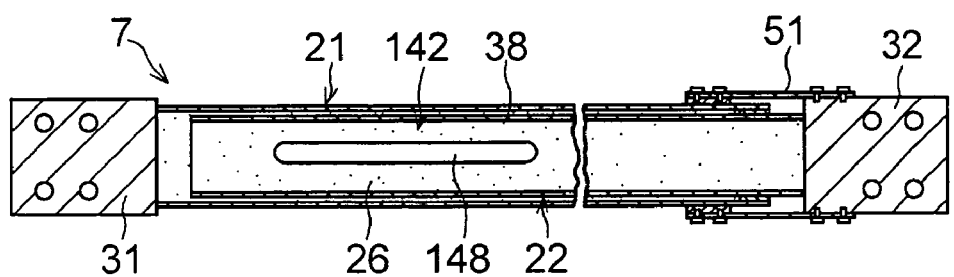
FIG. 15 is an explanatory cross-sectional view of a still further preferred embodiment in accordance with the invention.

In addition, as shown in FIG. 15, the control means 142 may include a compressible body 148 such as an air bag, foam rubber, a sponge, or the like which is embedded in the viscous body 26 filled in the interior of the hollow cylindrical portion 38, in substitution for or together with the flexible partition wall 145. Such a compressible body 148, instead of or together with being embedded in the viscous body 26 filled in the interior of the hollow cylindrical portion 38, may be embedded in the viscous body 26 filled in the interior of the hollow cylindrical portion 36 outside the hollow cylindrical portion 38, or in the viscous body 26 filled in the interior of the hollow cylindrical portion 106 in the case of the damper 101 shown in FIG. 9. In short, it suffices if the compressible body 148 is also embedded in the viscous body 26 so as to be capable of controlling the increase or decrease of the internal pressure of the viscous body 26 in the operation.

Figure 16:
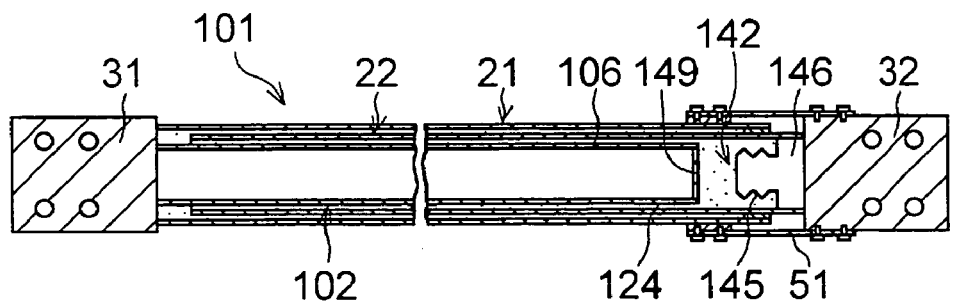
FIG. 16 is an explanatory cross-sectional view of a further preferred embodiment in accordance with the invention.
Figure 17:
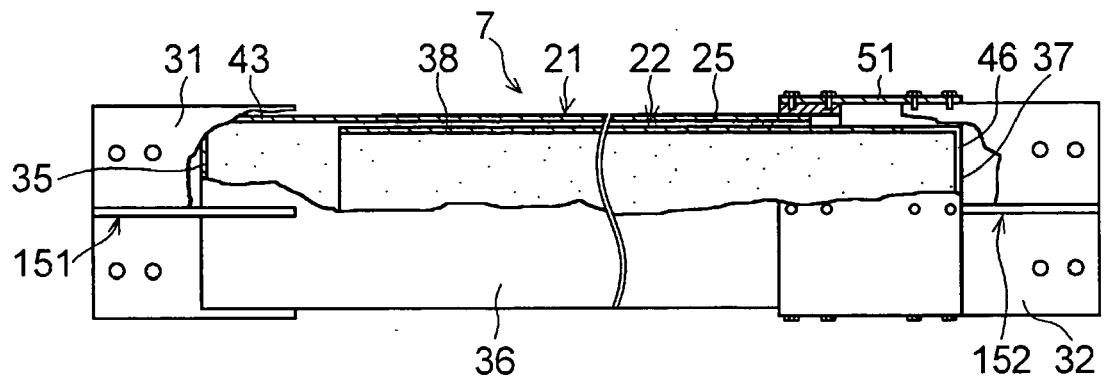
FIG. 17 is an explanatory cross-sectional view of a further preferred embodiment in accordance with the invention.
Figure 18:
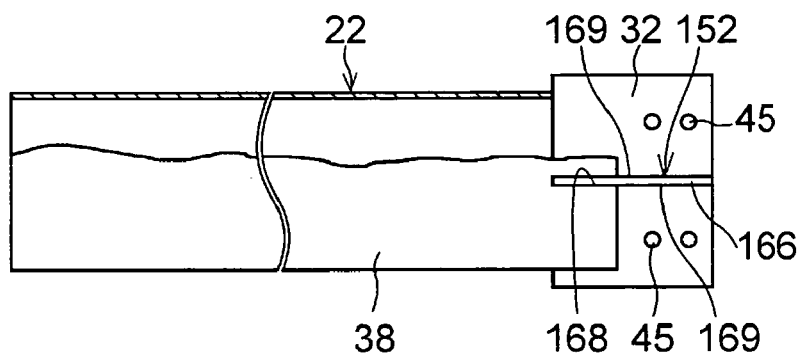
FIG. 18 is an explanatory cross-sectional view of a portion of the embodiment shown in FIG. 17.
Figure 19:
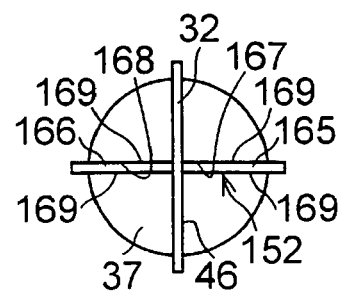
FIG. 19 is an explanatory right side view of FIG. 18.
Figure 20:
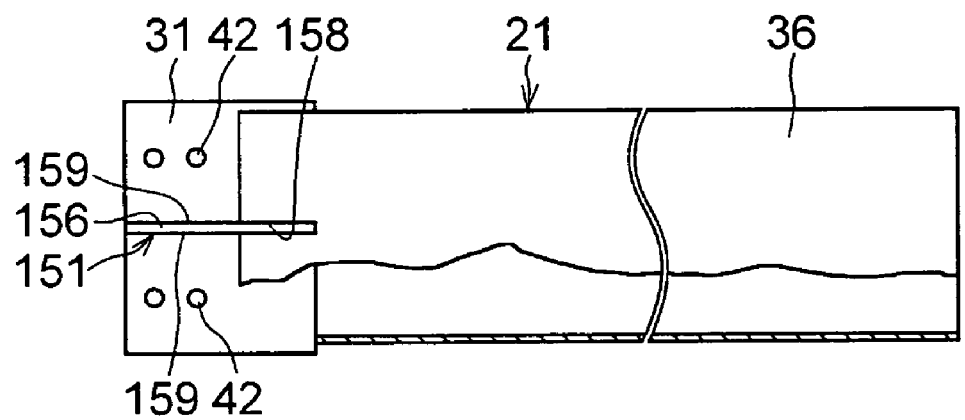
FIG. 20 is an explanatory cross-sectional view of a portion of the embodiment shown in FIG. 17.
Figure 21:
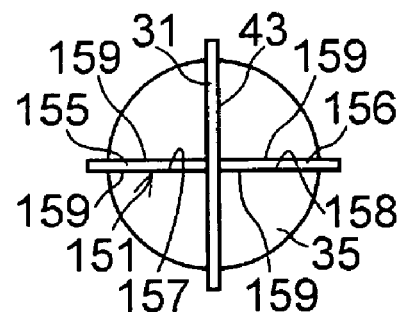
FIG. 21 is an explanatory left side view of FIG. 20.

In the case where the flexible partition wall 145 is disposed in the interior of the hollow cylindrical portion 38 of the elongated body 22 in the damper 101, for example, the elongated body 102 may be formed of a solid member instead of the hollow member. Furthermore, as shown in FIG. 16, the elongated body 102 may be formed of a hollow member having the hollow cylindrical portion 106 whose other end portion 124 side is also closed by a bottom portion 149. In the damper 101 shown in FIG. 16, the viscous body may not be filled inside the hollow cylindrical portion 106.

In each of the above-described dampers 7, 101, and 131, the respective attaching means is formed by the single attaching plate members 31 and 32. Alternatively, however, as shown in FIGS. 17 to 21, the damper 7, for instance, may be constructed by including additional single attaching plate members 151 and 152 in addition to the single attaching plate members 31 and 32, namely, by including one attaching means having one pair of attaching plate members 31 and 151 and the other attaching means having the other pair of attaching plate members 32 and 152.

The other one-side attaching plate member 151 has attaching plate pieces 155 and 156. In the same way as the attaching plate member 31, the attaching plate piece 155 is fitted in a slit 157 formed in the bottom portion 35 and the hollow cylindrical portion 36, and is secured to the bottom portion 35, the hollow cylindrical portion 36, and the attaching plate member 31 by welding or the like. In the same way as the attaching plate piece 155, the attaching plate piece 156 is fitted in a slit 158 formed in the bottom portion 35 and the hollow cylindrical portion 36, and is secured to the bottom portion 35, the hollow cylindrical portion 36, and the attaching plate member 31 by welding or the like. A wide surface 159 of the attaching plate member 151 consisting of the attaching plate pieces 155 and 156 intersects, i.e., orthogonally intersects in this embodiment, the wide attaching surface 61 of the attaching plate member 31.

The other other-side attaching plate member 152 has attaching plate pieces 165 and 166. In the same way as the attaching plate member 32, the attaching plate piece 165 is fitted in a slit 167 formed in the bottom portion 37 and the hollow cylindrical portion 38, and is secured to the bottom portion 37, the hollow cylindrical portion 38, and the attaching plate member 32 by welding or the like. In the same way as the attaching plate piece 165, the attaching plate piece 166 is fitted in a slit 168 formed in the bottom portion 37 and the hollow cylindrical portion 38, and is secured to the bottom portion 37, the hollow cylindrical portion 38, and the attaching plate member 32 by welding or the like. A wide surface 169 of the attaching plate member 152 consisting of the attaching plate pieces 165 and 166 intersects, i.e., orthogonally intersects in this embodiment, the wide attaching surface 62 of the attaching plate member 32.

According to the damper 7 shown in FIGS. 17 to 21, the attaching plate members 151 and 152 are respectively secured to the other end portion 29 of the elongated body 21 and the one end portion 30 of the elongated body 22 by means of the slits 157, 158, 167 and 168. Therefore, the securing of the attaching plate members 151 and 152 to the respective elongated bodies 21 and 22 can be made firmer. It is thus possible to avoid the troublesome situation in which the attaching plate members 151 and 152 become respectively removed from the elongated bodies 21 and 22 over a long period of use. Furthermore, since the wide surface 159 of the attaching plate member 151 orthogonally intersects the wide attaching surface 61 of the attaching plate member 31, and the wide surface 169 of the attaching plate member 152 orthogonally intersects the wide attaching surface 62 of the attaching plate member 32, it is possible to increase the flexural strength of the attaching plate members 31, 32, 151, and 152.

The above-described dampers 7 and 101 are constructed by including the holding means 33. However, the damping wall structure 1 may be constructed by the damper 7 or 101 not including the holding means 33, by using the holding means 33 as the temporarily fixing means with respect to the elongated body 21 before the installation of the damper 7 and 101 in the wall space 6 by means of the connecting means 66, and by loosening the bolts 50 and 54 and removing the holding means 33 after the installation in the wall space 6 by means of the connecting means 66. In this case, spacer pieces similar to the spacer pieces 121, 122, and 123 may be appropriately disposed newly or additionally, as required, between the hollow cylindrical portion 36 and the hollow cylindrical portion 38 and between the hollow cylindrical portion 38 and the hollow cylindrical portion 106.

Figure 22:
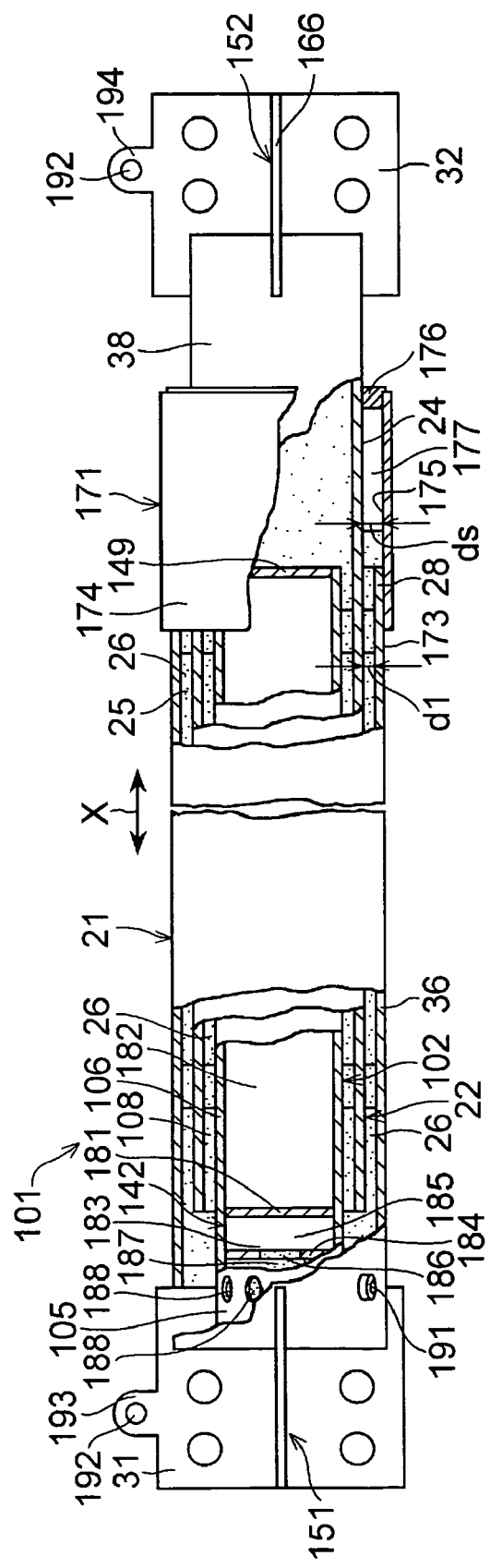
FIG. 22 is an explanatory cross-sectional view of a further preferred embodiment in accordance with the invention.

In addition, in the damper 7 or 101 in which the holding means 33 is omitted, a storage means may be provided for storing the viscous body 26 leaking from the gap 25 to the outside due to a temperature rise. For instance, as shown in FIG. 22, a storage means 171 provided in the damper 101 has a hollow cylindrical portion 174 secured to an outer surface 173 of the one end portion 28 of the hollow cylindrical portion 36 in the elongated body 21. An annular storage space 177 is formed by the outer surface 24 of the hollow cylindrical portion 38 and an inner surface 175 of the hollow cylindrical portion 174. To prevent the leakage of the viscous body 26 from the storage space 177 to outside the damper 101 and the entry of rainwater and dust into the storage space 177 from outside the damper 101, an annular cover member 176 is fitted between the hollow cylindrical portion 38 and the hollow cylindrical portion 174 so as to be slidable in the axial direction X with respect to the outer surface 24 of the hollow cylindrical portion 38 of the elongated body 22 and to be secured to the inner surface 175 of the hollow cylindrical portion 174. As for the storage space 177, its width ds in a direction perpendicular to the axial direction X is greater than the thickness d1. Consequently, the arrangement provided is such that even if a large quantity of viscous body 26 has overflowed from the gap 25, the viscous body 26 can be stored in the storage space 177 without a problem. It goes without saying that such a storage means 171 may be similarly provided for the damper 7.

With the damper 101 shown in FIG. 16, the control means 142 is formed by the flexible partition wall 145. Alternatively, however, as shown in FIG. 22, a disk-shaped closure member 181 may be is secured in the interior of the one end portion 105 of the hollow cylindrical portion 106 to partition the interior of the hollow cylindrical portion 106 into a closed space 182 and a space 183. Additionally, an annular member 184 may be similarly secured in the interior of the one end portion 105 of the hollow cylindrical portion 106 on the space 183 side by being located away from the closure member 181 in the axial direction X, to form an air chamber 185 and a space 187 with the viscous body 26 disposed therein. The control means 142 may thus be formed by the air chamber 185 communicating with the space 187 through a central hole 186 provided in the annular member 184. In the case where the damper 101 is provided with the control means 142 consisting of such an air chamber 185, it suffices if one or more through holes 188 allowing gaps 25 and 108 and the space 187 to communicate with each other are provided in the one end portion 105 of the hollow cylindrical portion 106, as shown in FIG. 22.

The air chamber 185 is adapted to decrease or increase its volume by the entry or exit of the viscous body 26 with respect to the air chamber 185 due to the increase or decrease of the internal pressure of the viscous body 26 in the relative movement of the elongated body 22 in the axial direction X with respect to the elongated bodies 21 and 102. Hence, the air chamber 185 is adapted to control the increase or decrease of the internal pressure of the viscous body 26 caused by the extension or retraction of the elongated body 22 with respect to the interior of the elongated body 21 and by the extension or retraction of the elongated body 102 with respect to the interior of the elongated body 22. In the damper 7 as well, an air chamber similar to the air chamber 185 may be formed in the interior of the other end side 112 of the hollow cylindrical portion 38, and the control means 142 may be formed by such an air chamber.

In addition, as shown in FIG. 22, a filling hole 191 with a plug may be provided in the other end portion 29 of the hollow cylindrical portion 36, and the filling hole 191 may be closed by the plug after the viscous body 26 is filled in the elongated body 21 and the like through the filling hole 191 before or after the installation in the wall space 6. To form the air chamber 185, in a state in which the cover member 176 is not fitted between the hollow cylindrical portion 38 and the hollow cylindrical portion 174, the filling of the viscous body 26 into the elongated body 21 and the like is effected by setting the damper 101 diagonally or uprightly, such that the pair of attaching plate members 32 and 152 secured to the one end portion 30 of the elongated body 22 through slits similar to the aforementioned ones are located higher than the pair of attaching plate members 31 and 151 secured to the other end portion 29 of the elongated body 21 and the one end portion 105 of the elongated body 102, respectively, through slits similar to the aforementioned ones. After the filling, it suffices if the cover member 176 is fitted between the hollow cylindrical portion 38 and the hollow cylindrical portion 174. In addition, to fill the viscous body 26 in the entire interior of the hollow cylindrical portion 38 in addition to the gap 108, by providing an air discharge port in the bottom portion 37, the filling of the viscous body 26 into the elongated body 21 and the like through the filling hole 191 may be continued even after the fitting of the cover member 176 between the hollow cylindrical portion 38 and the hollow cylindrical portion 174, and after the viscous body 26 is filled in the entire interior of the hollow cylindrical portion 38, the air discharge port may be closed. Further, the viscous body 26 may be filled in the interior of the hollow cylindrical portion 38 through such an air discharge port, and after the viscous body 26 is filled in the entire interior of the hollow cylindrical portion 38, the air discharge port may be closed.

Furthermore, as shown in FIG. 22, the attaching plate members 31 and 32 may be respectively provided with tongue portions 193 and 194 each having a through hole 192 for suspending the damper 101 in the transport, installation, temporary fixation, and the like of the damper 101.

Figure 23:
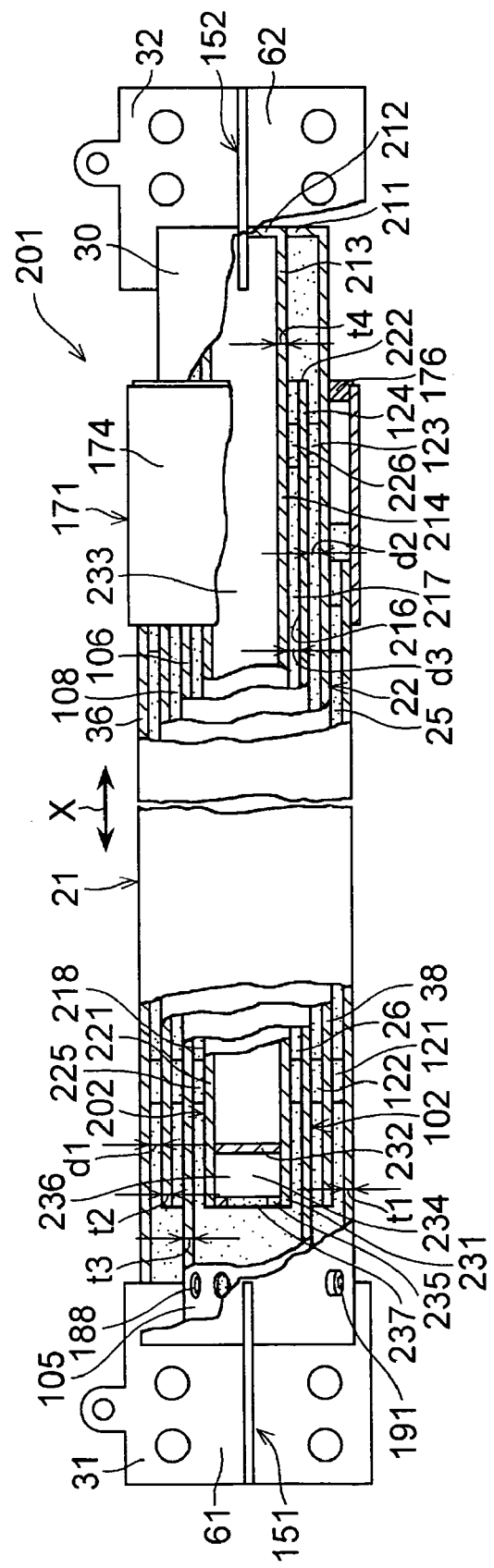
FIG. 23 is an explanatory cross-sectional view of a further preferred embodiment in accordance with the invention.

Although the above-described damper 101 is constructed by including the elongated bodies 21, 22, and 102, a damper 201 may alternatively be constructed by further including the hollow elongated body 202 in addition to the elongated bodies 21, 22, and 102, as shown in FIG. 23.

In the damper 201 shown in FIG. 23, the elongated bodies 22 and 102 are intermediate elongated bodies located midway between the elongated bodies 21 and 202. Accordingly, one intermediate elongated body is formed by the elongated body 22, while the other intermediate elongated body is formed by the elongated body 102. The elongated body 202 is an inner elongated body disposed on the inner side with respect to the respective elongated bodies 21, 22, and 102.

In the damper 201, the elongated body 22 has an annular bottom portion 211 which is integral with its hollow cylindrical portion 36. In the same way as the elongated body 102, the inner hollow elongated body 202 consists of a bottomed cylindrical member having a disk-shaped bottom portion 212 and a hollow cylindrical portion 214 which is formed integrally with the bottom portion 212 and whose one end portion 213 side is closed by the bottom portion 212. As for the elongated body 22, its bottom portion 211 is secured to the bottom portion 212 by welding or the like and is integrated with the elongated body 202. The hollow cylindrical portion 214 of the elongated body 202 includes an inserted portion 221 which has an outer surface 218 extending in the axial direction X and disposed with a gap 217 with respect to an inner surface 216, extending in the axial direction X, of the hollow cylindrical portion 106 of the elongated body 102, and which is inserted in the hollow cylindrical portion 106 of the elongated body 102 so as to be relatively movable in the axial direction X. Further, the hollow cylindrical portion 214 of the 202 includes the one end portion 213 which integrally extends from the inserted portion 221 in the axial direction X and projects to outside the hollow cylindrical portion 106 from the other end portion 124 on an opening end 222 side, in the axial direction X, of the hollow cylindrical portion 106. The viscous body 26 is disposed in the gap 217 as well in addition to the gaps 25 and 108 in such a manner as to be in contact with the inner surface 216 and the outer surface 218. The attaching plate members 32 and 152 are respectively fitted in the slit formed in the bottom portion 211 and the one end portion 30 of the hollow cylindrical portion 38 of the elongated body 22 and in the slit formed in the bottom portion 212 and the one end portion 213 of the hollow cylindrical portion 214 of the elongated body 202, and is secured to the bottom portion 211 and the one end portion 30 of the hollow cylindrical portion 38 of that outer elongated body 22 and to the bottom portion 212 and the one end portion 213 of the hollow cylindrical portion 214 of the elongated body 202, in the same way as described above. The viscous body 26 is tightly filled in the gaps 25, 108, and 217 and in the interiors of the hollow cylindrical portions 36, 38, and 106 other than the gaps 25, 108, and 217.

In addition, in the damper 201 as well, the attaching plate members 31 and 151 serving as the one attaching means are secured to the elongated bodies 21 and 102 in the same way as the damper 101.

Furthermore, in the damper 201, in addition to the spacer pieces 121, 122, and 123, spacer pieces 225 and 226 equivalent to the spacer pieces 121, 122, and 123 are provided by being respectively secured to the outer surface 218 of the hollow cylindrical portion 214. Outer surfaces of the spacer pieces 225 and 226 are brought into contact with the inner surface 216 of the hollow cylindrical portion 106 so as to be relatively slidable in the axial direction X and in the direction R about the axis 60, and the gap 217 is thus held by the spacer pieces 225 and 226.

With the damper 201 as well, the elongated bodies 21 and 102 and the elongated bodies 22 and 202 are relatively movable with respect to each other in the axial direction X. The wide attaching surface 61 of the attaching plate member 31, which is secured to the other end portion 29 of the elongated body 21 and the one end portion 105 of the elongated body 102, respectively, through slits similar to the aforementioned ones, is substantially parallel to the wide attaching surface 62 of the attaching plate member 32, which is secured to the one end portion 30 of the elongated body 22 and the one end portion 213 of the elongated body 202, respectively, through slits similar to the aforementioned ones. The elongated bodies 21 and 102 and the elongated bodies 22 and 202 in this embodiment are also relatively rotatable about the axis 60 in the direction R with respect to each other.

In the damper 201, if it is assumed that the thickness of the gap 25 in the direction perpendicular to the axial direction is d1, that the thickness of the gap 108 in the direction perpendicular to the axial direction is d2, that the thickness of the gap 217 in the direction perpendicular to the axial direction is d3, and that the thickness of the hollow cylindrical portion, in the direction perpendicular to the axial direction, of at least one of the outer and inner elongated bodies 21 and 202 and the intermediate elongated bodies 22 and 202, i.e., the thicknesses of the hollow cylindrical portions 36, 38, 106, and 214 of the elongated bodies 21, 22, 102, and 202 in this embodiment, are t1, t2, t3, and t4, respectively, then the thicknesses d1, d2, and d3 and the thicknesses t1, t2, t3 and t4 have the relationships of the following formulae (15) to (26):

$$10 \leq d1 \cdot t1 \leq 100 \tag{15}$$

$$0.5 \leq t1/d1 \leq 8 \tag{16}$$

$$10 \leq d1 \cdot t2 \leq 100 \tag{17}$$

$$0.5 \leq t2/d1 \leq 8 \tag{18}$$

$$10 \leq d2 \cdot t2 \leq 100 \tag{19}$$

$$0.5 \leq t2/d2 \leq 8 \tag{20}$$

$$10 \leq d2 \cdot t3 \leq 100 \tag{21}$$

$$0.5 \leq t3/d2 \leq 8 \tag{22}$$

$$10 \leq d3 \cdot t3 \leq 100 \tag{23}$$

$$0.5 \leq t3/d3 \leq 8 \tag{24}$$

$$10 \leq d3 \cdot t4 \leq 100 \tag{25}$$

$$0.5 \leq t4/d3 \leq 8 \tag{26}$$

Furthermore, in the damper 201, a disk-shaped closure member 232 may be secured in the interior of the other end portion 231 of the hollow cylindrical portion 214 to partition the interior of the hollow cylindrical portion 214 into a closed space 233 and a space 234. Additionally, an annular member 235 may be similarly secured in the interior of the other end portion 231 of the hollow cylindrical portion 214 on the space 234 side by being located away from the closure member 232 in the axial direction X, to form an air chamber 236. The control means 142 may thus be formed by the air chamber 236 communicating with the gap 217 and the like through a central hole 237 provided in the annular member 235. Such a control means 142 is also adapted to control the increase or decrease of the internal pressure of the viscous body 26 caused by the extension or retraction of each of the elongated bodies 22 and 202 with respect to the interior of each of the elongated bodies 21 and 102, by the use of the air chamber 236 which is formed in the interior of the elongated body 202 and whose volume decreases or increases due to the increase or decrease of the internal pressure of the viscous body 26. The damper 201 may be constructed by including the control means 142 consisting of the above-described flexible partition wall 145 or compressible body 148, in substitution for the control means 142 consisting of the air chamber 236 or together with such a control means 142.

With the damper 201, it is not necessary to provide the through hole 188 in the one end portion 105 of the hollow cylindrical portion 106. However, if such a through hole 188 is provided in the one end portion 105, the filling into the elongated body 102 can be effected speedily at the time of the filling of the viscous body 26 into the damper 201 through the filling hole 191.

In the same way as the dampers 7 and 101, the above-described damper 201 is used in the damping wall structure 1 in place of the damper 7 or 101 by being connected to the lower horizontal member 5 by means of the connecting means 65 shown in FIG. 5 and to the upper horizontal member 4 by means of the connecting means 66, respectively, such that the wide attaching surfaces 61 and 62 of both attaching plate members 31 and 32 are disposed in parallel to the plane of the wall space 6.

With the damping wall structure 1 having the damper 201, it is possible to obtain the advantages in the same way as the above-described damping wall structure 1 having the damper 7 or 101. Moreover, in the relative movement of the elongated bodies 22 and 202 in the axial direction X with respect to the elongated bodies 21 and 102 due to an earthquake or the like, viscous shear deformation is caused to occur not only in the viscous body 26 disposed in the gaps 25 and 108 but also in the viscous body 26 disposed in the gap 217, making it possible to absorb the relative vibrational energy. In consequence, it is possible to damp at an early period the vibration of the building caused by the earthquake or the like. In addition, with the damper 201, in the same way as the dampers 7 and 101, the securing of the attaching plate members 31 and 32 to the respective elongated bodies 21, 22, 102, and 202 can be made firmer. It is thus possible to avoid the troublesome situation in which the respective attaching plate members 31 and 32 become removed from the elongated bodies 21, 22, 102, and 202 over a long period of use. Still further, since the attaching plate members 151 and 152 are provided, the flexural strength of the attaching plate members 31 and 32 is increased.

Further, with the damper 201, the strength of the hollow cylindrical portions 36, 38, 106, and 214 of the respective elongated bodies 21, 22, 102, and 202 is sufficiently ensured irrespective of the magnitudes of the thicknesses d1, d2, and d3. Moreover, it becomes possible to provide the damper 201 having the weight and diameter corresponding to the magnitude of the damping force generated. Further, it is possible to allow the heat generated in the viscous body 26 to escape efficiently and speedily through the hollow cylindrical portions 36, 38, 106, and 214 of the respective elongated bodies 21, 22, 102, 202 and eliminate a temperature rise of the viscous body 26 itself, thereby making it possible to generate an intended damping force. Additionally, since large pressure fluctuations are not caused in the viscous body 26 even in the relative movement of the elongated bodies 22 and 202 in the axial direction X with respect to the elongated bodies 21 and 102, it becomes possible to efficiently damp the vibration of the building or the like caused by the earthquake or the like.

In the above-described dampers 7, 101, and 201, the respective attaching means are formed by fitting the attaching plate members 31 and 32 into the slits 43 and 46. Alternatively, however, the respective attaching means may be formed by using collar members or cover members, i.e., cover members 241 and 242 in this embodiment, as shown in FIGS. 24 to 29.

Figure 24:
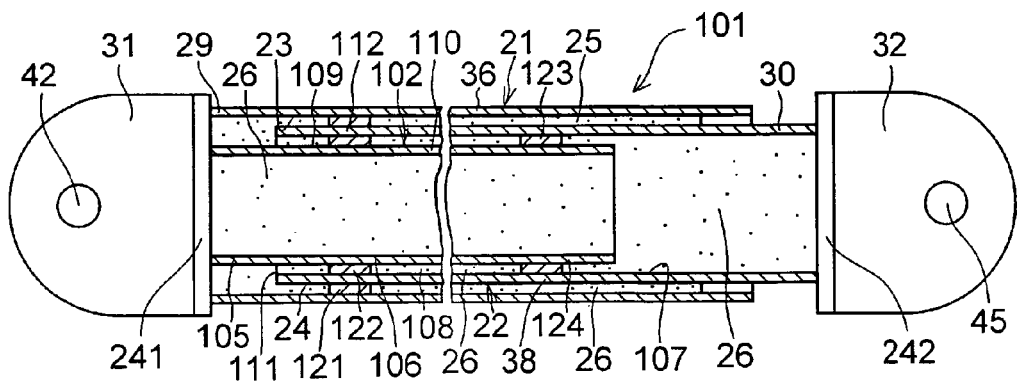
FIG. 24 is an explanatory front cross-sectional view of a further preferred embodiment in accordance with the invention.
Figure 25:
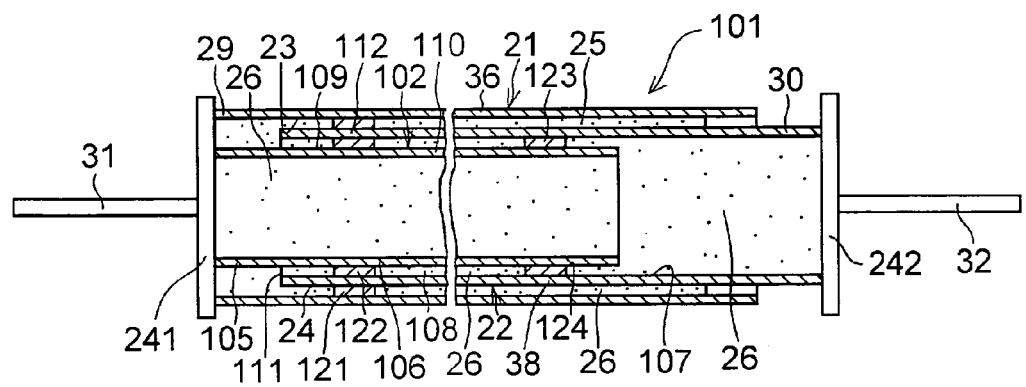
FIG. 25 is an explanatory plan cross-sectional view of the embodiment shown in FIG. 24.

Namely, in the damper 101 shown in FIGS. 24 and 25, the one attaching means includes the cover member 241 secured to the other end portion 29 of the hollow cylindrical portion 36 of the elongated body 21 and to the one end portion 105 of the hollow cylindrical portion 106 of the elongated body 102, respectively, as well as the attaching plate member 31 secured to the cover member 241 by welding or the like. The other attaching means includes the cover member 242 secured to the one end portion 30 of the hollow cylindrical portion 38 of the elongated body 22 by welding or the like, as well as the attaching plate member 32 secured to the cover member 242. The attaching plate member 31 is secured to the cover member 241 and is secured to the other end portion 29 of the elongated body 21 and the one end portion 105 of the elongated body 102. Meanwhile, the attaching plate member 32 is secured to the cover member 242 and is secured to the one end portion 30 of the elongated body 22.

Figure 26:
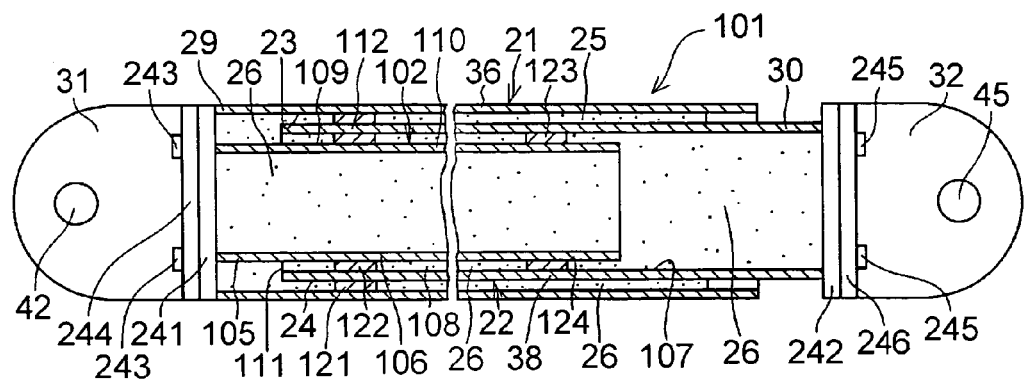
FIG. 26 is an explanatory front cross-sectional view of a further preferred embodiment in accordance with the invention.
Figure 27:
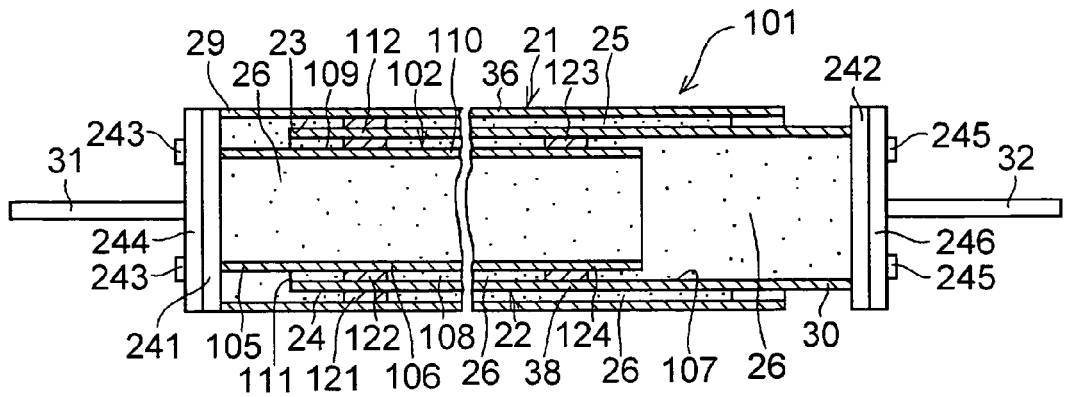
FIG. 27 is an explanatory plan cross-sectional view of the embodiment shown in FIG. 26.

In addition, in the damper 101 shown in FIGS. 26 and 27, the one attaching means includes, in addition to the cover member 241 and the attaching plate member 31, a collar member 244 which is secured to the cover member 241 by means of bolts 243 and to which the attaching plate member 31 is secured by welding or the like. The other attaching means includes, in addition to the cover member 242 and the attaching plate member 32, a collar member 246 which is secured to the cover member 242 by means of bolts 245 and to which the attaching plate member 32 is secured by welding or the like. The attaching plate member 31 is secured to the cover member 241 by means of the collar member 244 and the bolts 243, and is secured to the other end portion 29 of the elongated body 21 and the one end portion 105 of the elongated body 102. Meanwhile, the attaching plate member 32 is secured to the cover member 242 by means of the collar member 246 and the bolts 245, and is secured to the one end portion 30 of the elongated body 22.

Figure 28:
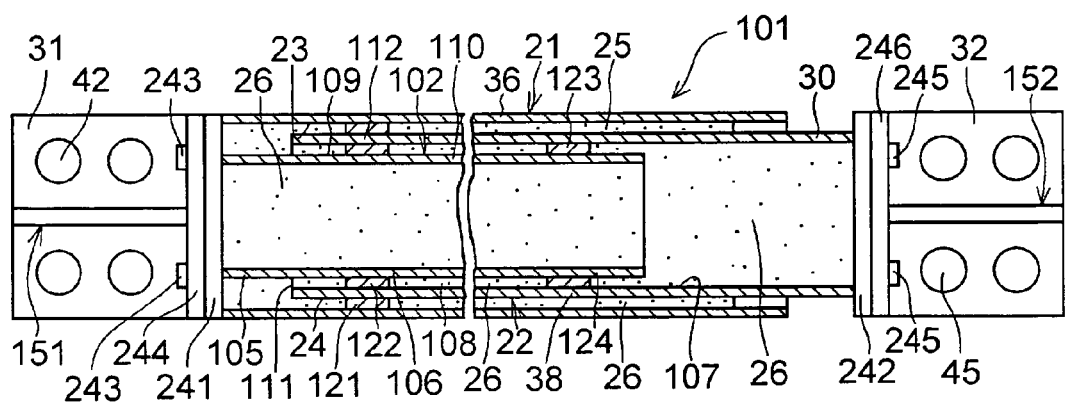
FIG. 28 is an explanatory front cross-sectional view of a further preferred embodiment in accordance with the invention.
Figure 29:
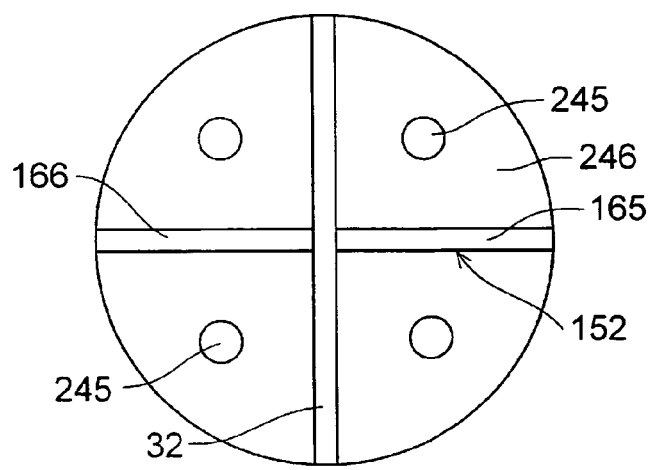
FIG. 29 is a right side view of the embodiment shown in FIG. 28.

Furthermore, in the damper 101 shown in FIGS. 28 and 29, the one attaching means includes, in addition to the cover member 241, the attaching plate member 31, and the collar member 244, the attaching plate member 151 secured to the attaching plate member 31 and the collar member 244 by welding or the like. The other attaching means includes, in addition to the cover member 242, the attaching plate member 32, and the collar member 246, the attaching plate member 152 secured to the attaching plate member 32 and the collar member 246 by welding or the like.

As shown in FIGS. 24 to 27, the attaching plate members 31 and 32 may be respectively provided with the single through holes 42 and 45, so as to install the damper 101 in the wall space 6 by means of the connecting means having bolts which are respectively inserted in the through holes 42 and 45.

The respective attaching means shown in FIGS. 24 to 29 may also be used for the dampers 7 and 201 in a similar manner.

Although in the foregoing embodiments each damper is disposed in the wall space 6, in substitution for or in conjunction with this arrangement the damper may be disposed on at least one of the columns 2 and 3 in such a manner as to extend substantially in parallel to the columns 2 and 3 in a substantially vertical direction.

The invention claimed is:

1. A damper comprising:
a hollow outer elongated body having a hollow portion defined by an axially extending inner surface thereof,
an inner elongated body, and
at least two hollow intermediate elongated bodies each having a hollow portion defined by an axially extending inner surface thereof,
one of said hollow intermediate elongated bodies including an inserted portion which has an outer surface extending in an axial direction and is disposed in said hollow portion of said hollow outer elongated body with a first gap on said outer surface thereof with respect to said axially extending inner surface of said hollow outer elongated body, and which is inserted in said hollow portion of said hollow outer elongated body so as to be relatively movable in the axial direction, and one axial end portion which integrally extends from said inserted portion of said one of said hollow intermediate elongated bodies in the axial direction and projects to the outside from one axial end portion of said hollow outer elongated body,
another one of said hollow intermediate elongated bodies including an inserted portion which is disposed in said hollow portions of said hollow outer elongated body and said one of said hollow intermediate elongated bodies, and which is inserted in said hollow portion of said one of said hollow intermediate elongated bodies so as to be relatively movable in the axial direction, and one axial end portion which integrally extends from said inserted portion of said another one of said hollow intermediate elongated bodies in the axial direction and projects to the outside from another axial end portion of said one of said hollow intermediate elongated bodies,
said inner elongated body including an inserted portion which has an outer surface extending in the axial direction and is disposed in said hollow portions of said hollow outer elongated body and both said hollow intermediate elongated bodies with a second gap on said outer surface thereof with respect to said axially extending inner surface of said another one of said intermediate elongated bodies, and which is inserted in said hollow portion of said another one of said hollow intermediate elongated bodies so as to be relatively movable in the axial direction, and an axial end portion which integrally extends from said inserted portion of said inner elongated body in the axial direction and projects to the outside from another axial end portion of said another one of said hollow intermediate elongated bodies, a viscous body or a viscoelastic body being disposed in the first gap between the axially extending inner surface of said hollow outer elongated body and the outer surface of said one of said hollow intermediate elongated bodies and the second gap between the axially extending inner surface of said another one of said hollow intermediate elongated bodies and the outer surface of said inner elongated body in such a manner as to be in contact with the axially extending inner surfaces and the outer surfaces, a first attaching structure being provided on another axial end portion of said hollow outer elongated body and the one axial end portion of said another one of said hollow intermediate elongated bodies, a second attaching structure being provided on the one axial end portion of said one of said hollow intermediate elongated bodies and said axial end portion of said inner elongated body.

2. The damper according to claim 1, comprising: a controller to control an increase or decrease of the internal pressure of the viscous body or the viscoelastic body due to the extension or retraction of said inserted portion of said one of said hollow intermediate elongated bodies in the axial direction with respect to said hollow portion of said hollow outer elongated body.

3. The damper according to claim 2, wherein said controller has a compressible body including one of an air bag, a foam rubber or a sponge which is embedded in the viscous body or the viscoelastic body, and whose volume decreases or increases due to the increase or decrease of the internal pressure of the viscous body or the viscoelastic body.

4. The damper according to claim 2, wherein said controller has an air chamber whose volume decreases or increases due to the increase or decrease of the internal pressure of the viscous body or the viscoelastic body.

* * * * *